United States Patent
Chen et al.

(10) Patent No.: US 11,638,019 B2
(45) Date of Patent: Apr. 25, 2023

(54) METHODS AND SYSTEMS FOR PREDICTION FROM MULTIPLE CROSS-COMPONENTS

(71) Applicant: ALIBABA GROUP HOLDING LIMITED, Grand Cayman (KY)

(72) Inventors: Jie Chen, San Mateo, CA (US); Ru-Ling Liao, San Mateo, CA (US); Yan Ye, San Mateo, CA (US); Xinwei Li, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/387,242

(22) Filed: Jul. 28, 2021

(65) Prior Publication Data
US 2022/0038722 A1 Feb. 3, 2022

Related U.S. Application Data

(60) Provisional application No. 63/057,956, filed on Jul. 29, 2020.

(51) Int. Cl.
*H04N 19/186* (2014.01)
*H04N 19/176* (2014.01)
*H04N 19/196* (2014.01)
*H04N 19/132* (2014.01)
*H04N 19/46* (2014.01)

(52) U.S. Cl.
CPC ......... *H04N 19/196* (2014.11); *H04N 19/132* (2014.11); *H04N 19/176* (2014.11); *H04N 19/186* (2014.11); *H04N 19/46* (2014.11)

(58) Field of Classification Search
CPC .. H04N 19/196; H04N 19/132; H04N 19/176; H04N 19/186; H04N 19/46

USPC .................................................... 375/240.02
See application file for complete search history.

(56) References Cited

U.S. PATENT DOCUMENTS

| | | | |
|---|---|---|---|
| 11,259,016 B2 * | 2/2022 | Li | H04N 19/157 |
| 2014/0160139 A1 | 6/2014 | MacInnis et al. | |
| 2019/0281267 A1 | 9/2019 | Fuchie et al. | |
| 2019/0320187 A1 | 10/2019 | Fuchie et al. | |

(Continued)

FOREIGN PATENT DOCUMENTS

| | | | | |
|---|---|---|---|---|
| CN | 106134201 A | * | 11/2016 | H04N 19/117 |
| WO | WO-2021247881 A1 | * | 12/2021 | |
| WO | WO 2022/022655 A1 | | 2/2022 | |

OTHER PUBLICATIONS

PCT International Search Report and Written Opinion dated Oct. 27, 2021, issued in corresponding International Application No. PCT/CN2021/109408 (7 pgs.).

*Primary Examiner* — Albert Kir
(74) *Attorney, Agent, or Firm* — Finnegan, Henderson, Farabow, Garrett & Dunner, LLP

(57) ABSTRACT

The present disclosure provides methods, apparatus and non-transitory computer readable medium for processing video data. According to certain disclosed embodiments, a method includes: determining a set of parameters from a plurality of sets of parameters wherein the set of parameters includes a scaling factor; determining a predicted sample value of a first chroma component based on the set of the parameters, a reconstructed sample value of a luma component and a reconstructed sample value of a second chroma component; and signaling an index associated with the set of parameters in a bitstream.

28 Claims, 17 Drawing Sheets

(56) References Cited

U.S. PATENT DOCUMENTS

| | | |
|---|---|---|
| 2019/0349581 A1 | 11/2019 | Fuchie et al. |
| 2022/0038722 A1* | 2/2022 | Chen .................... H04N 19/105 |
| 2022/0060702 A1* | 2/2022 | Li .......................... H04N 19/46 |
| 2022/0103815 A1* | 3/2022 | Zhang ................. H04N 19/186 |

* cited by examiner

1300

An updated prediction value of Cr component is determined by defining a linear relationship between an initial prediction value of Cr component and a residual value of Cb component, wherein the Initial prediction value of Cr component and the Initial prediction value of Cb component are generated with any prediction mode. — 1302

METHODS AND SYSTEMS FOR PREDICTION FROM MULTIPLE CROSS-COMPONENTS

CROSS-REFERENCE TO RELATED APPLICATIONS

The disclosure claims the benefits of priority to U.S. Provisional Application No. 63/057,956, filed on Jul. 29, 2020, which is incorporated herein by reference in its entirety.

TECHNICAL FIELD

The present disclosure generally relates to video processing, and more particularly, to methods and systems for prediction from multiple cross-components.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a video encoding method. The method includes: determining a set of parameters from a plurality of sets of parameters wherein the set of parameters includes a scaling factor; determining a predicted sample value of a first chroma component based on the set of the parameters, a reconstructed sample value of a luma component and a reconstructed sample value of a second chroma component; and signaling an index associated with the set of parameters in a bitstream.

Embodiments of the present disclosure provide a video decoding method. The method includes: decoding an index from a video bitstream; determining a set of parameters from a plurality of sets of parameters based on the index, wherein the set of parameters includes a scaling factor; and determining a predicted sample value of a first chroma component based on the set of the parameters, a reconstructed sample value of a luma component and a reconstructed sample value of a second chroma component.

Embodiments of the present disclosure provide an apparatus for performing video data processing, the apparatus including: a memory figured to store instructions; and one or more processors configured to execute the instructions to cause the apparatus to perform: determining a set of parameters from a plurality of sets of parameters wherein the set of parameters includes a scaling factor; determining a predicted sample value of a first chroma component based on the set of the parameters, a reconstructed sample value of a luma component and a reconstructed sample value of a second chroma component; and signaling an index associated with the set of parameters in a bitstream.

Embodiments of the present disclosure provide an apparatus for performing video data processing, the apparatus including: a memory figured to store instructions; and one or more processors configured to execute the instructions to cause the apparatus to perform: decoding an index from a video bitstream; determining a set of parameters from a plurality of sets of parameters based on the index, wherein the set of parameters includes a scaling factor; and determining a predicted sample value of a first chroma component based on the set of the parameters, a reconstructed sample value of a luma component and a reconstructed sample value of a second chroma component.

Embodiments of the present disclosure provide a non-transitory computer-readable storage medium that stores a set of instructions that is executable by one or more processors of an apparatus to cause the apparatus to initiate a method for performing video data processing, the method includes: determining a set of parameters from a plurality of sets of parameters wherein the set of parameters includes a scaling factor; determining a predicted sample value of a first chroma component based on the set of the parameters, a reconstructed sample value of a luma component and a reconstructed sample value of a second chroma component; and signaling an index associated with the set of parameters in a bitstream.

Embodiments of the present disclosure provide a non-transitory computer-readable storage medium that stores a set of instructions that is executable by one or more processors of an apparatus to cause the apparatus to initiate a method for performing video data processing, the method includes: decoding an index from a video bitstream; determining a set of parameters from a plurality of sets of parameters based on the index, wherein the set of parameters includes a scaling factor; and determining a predicted sample value of a first chroma component based on the set of the parameters, a reconstructed sample value of a luma component and a reconstructed sample value of a second chroma component.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
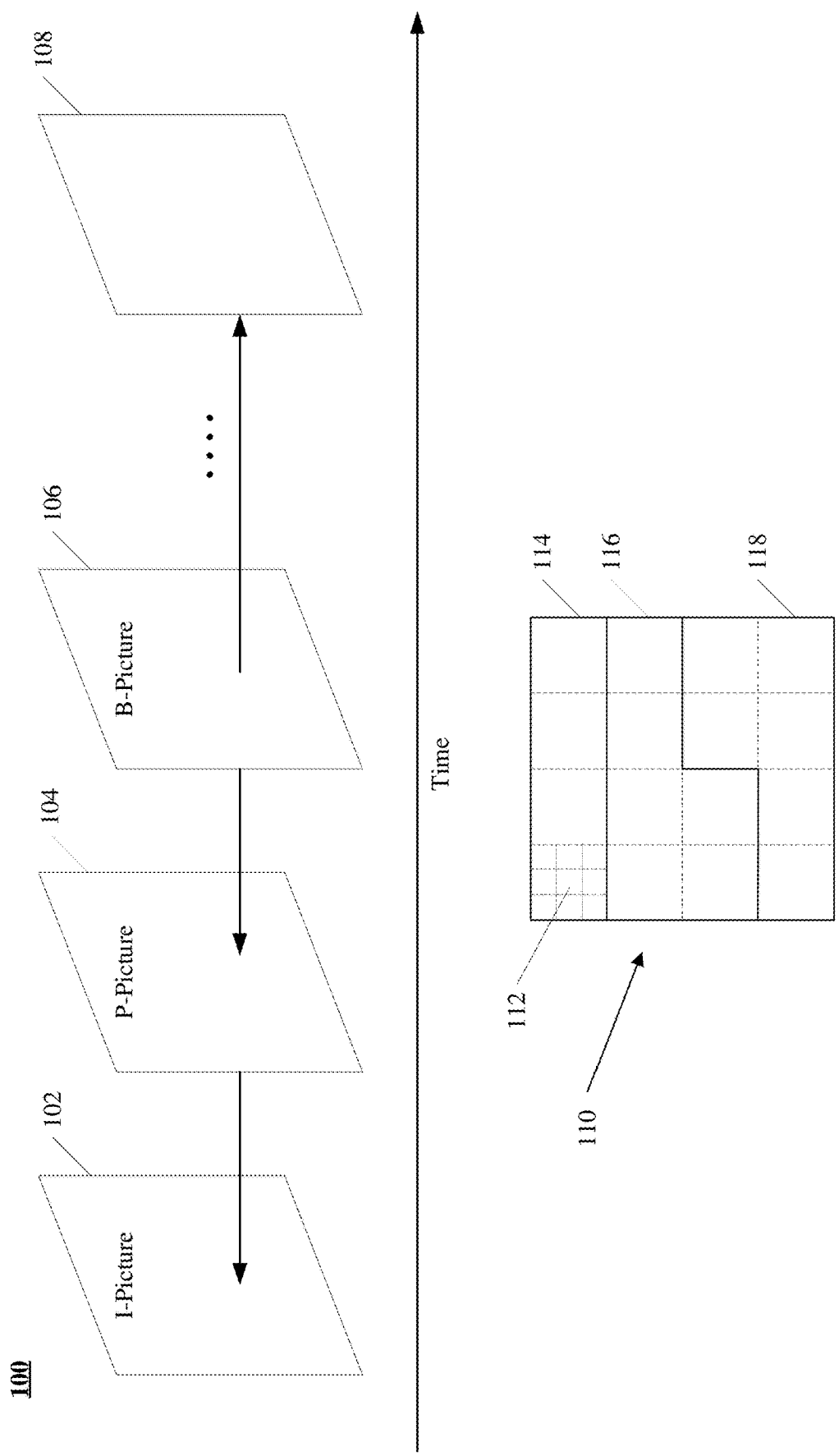
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

New standards for video coding are being developed in the industry. For example, the Audio Video coding Standard ("AVS") Workgroup is developing a third generation of AVS video standard, namely AVS3. High Performance Model ("HPM") has been chosen by the workgroup as a new reference software platform for AVS3. The first phase of the AVS3 standard was able to achieve more than 20% coding performance gain over its predecessor AVS2, and the second phase of the AVS3 standard is still under development.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
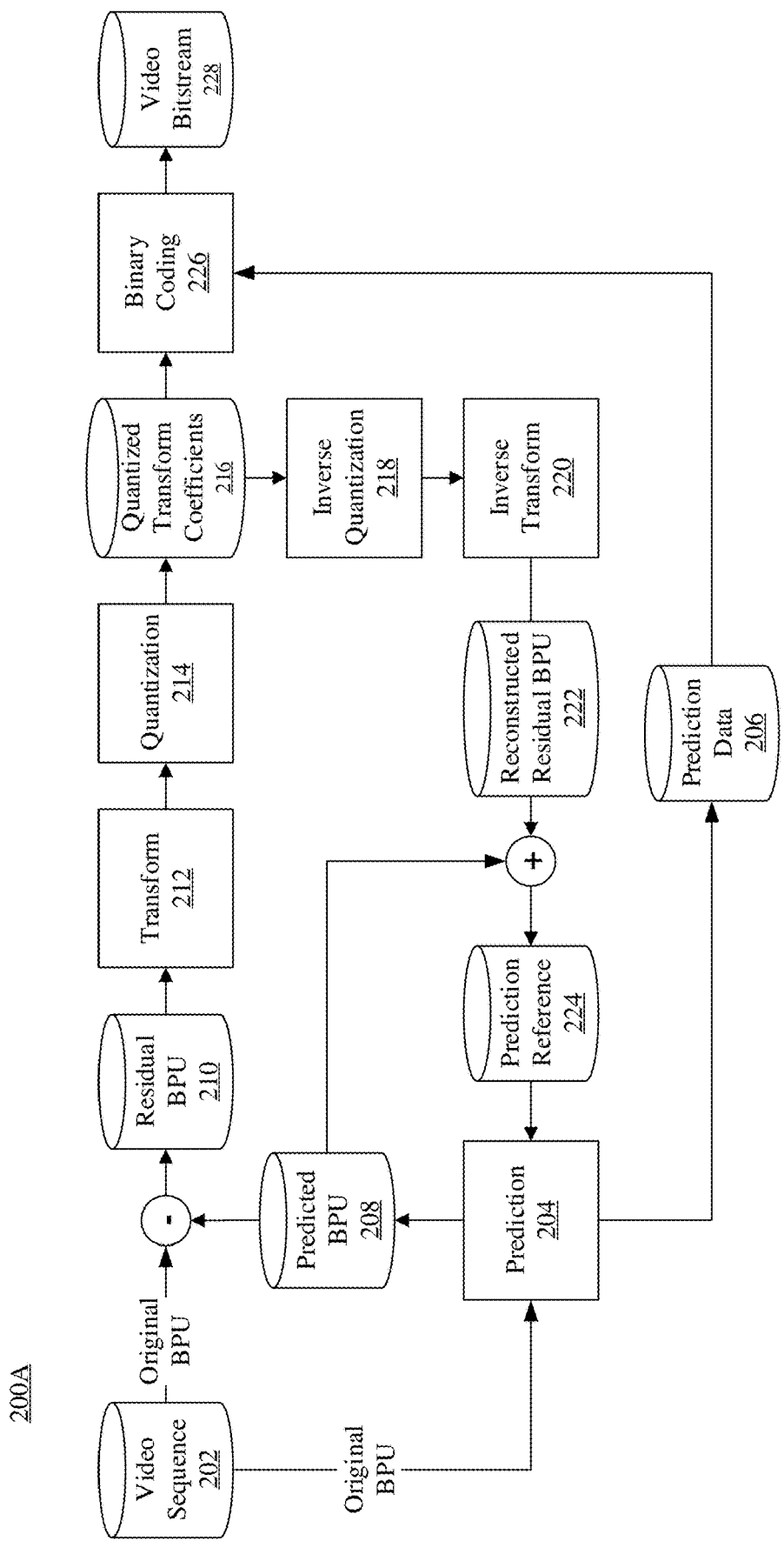
FIG. 2A is a schematic diagram illustrating an exemplary encoding process of a hybrid video coding system, consistent with embodiments of the disclosure.
Figure 2B:
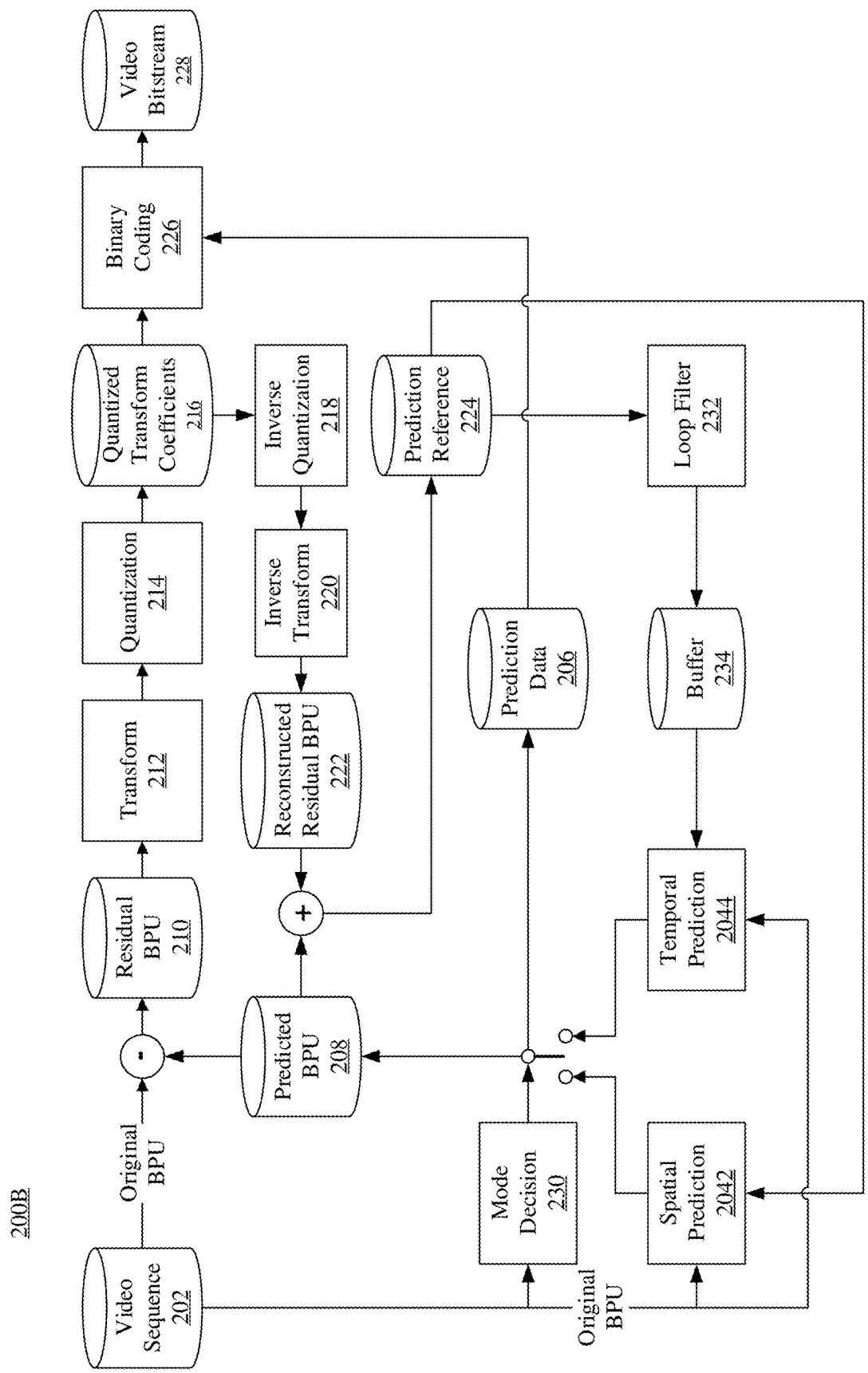
FIG. 2B is a schematic diagram illustrating another exemplary encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
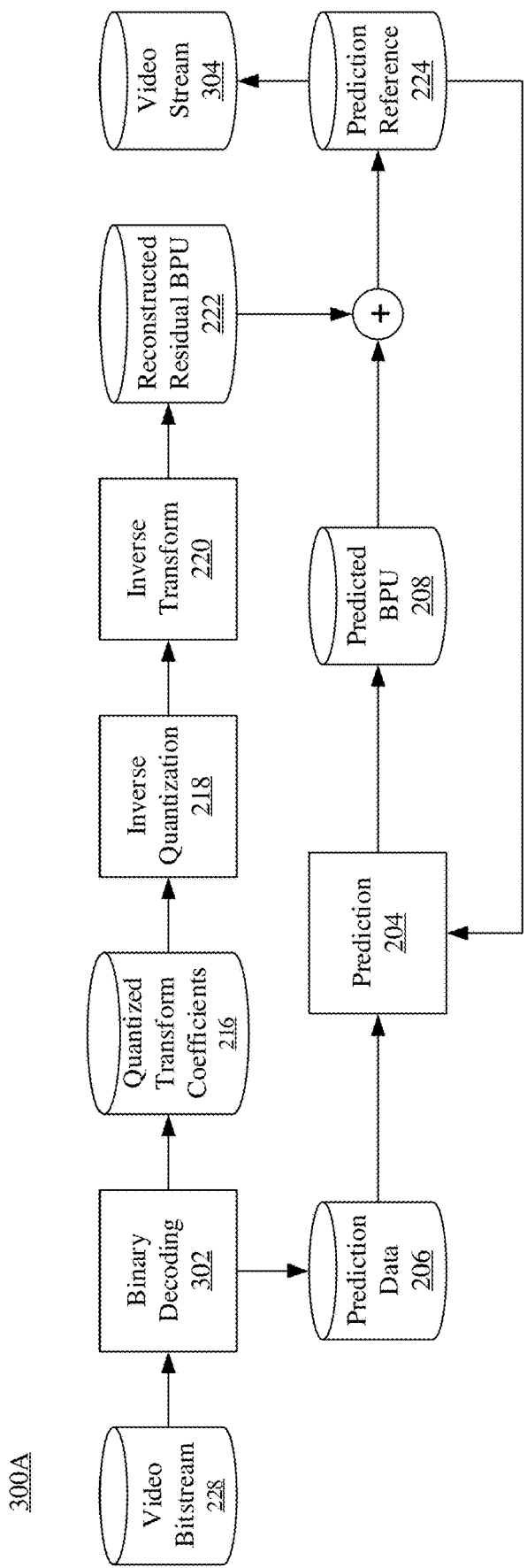
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
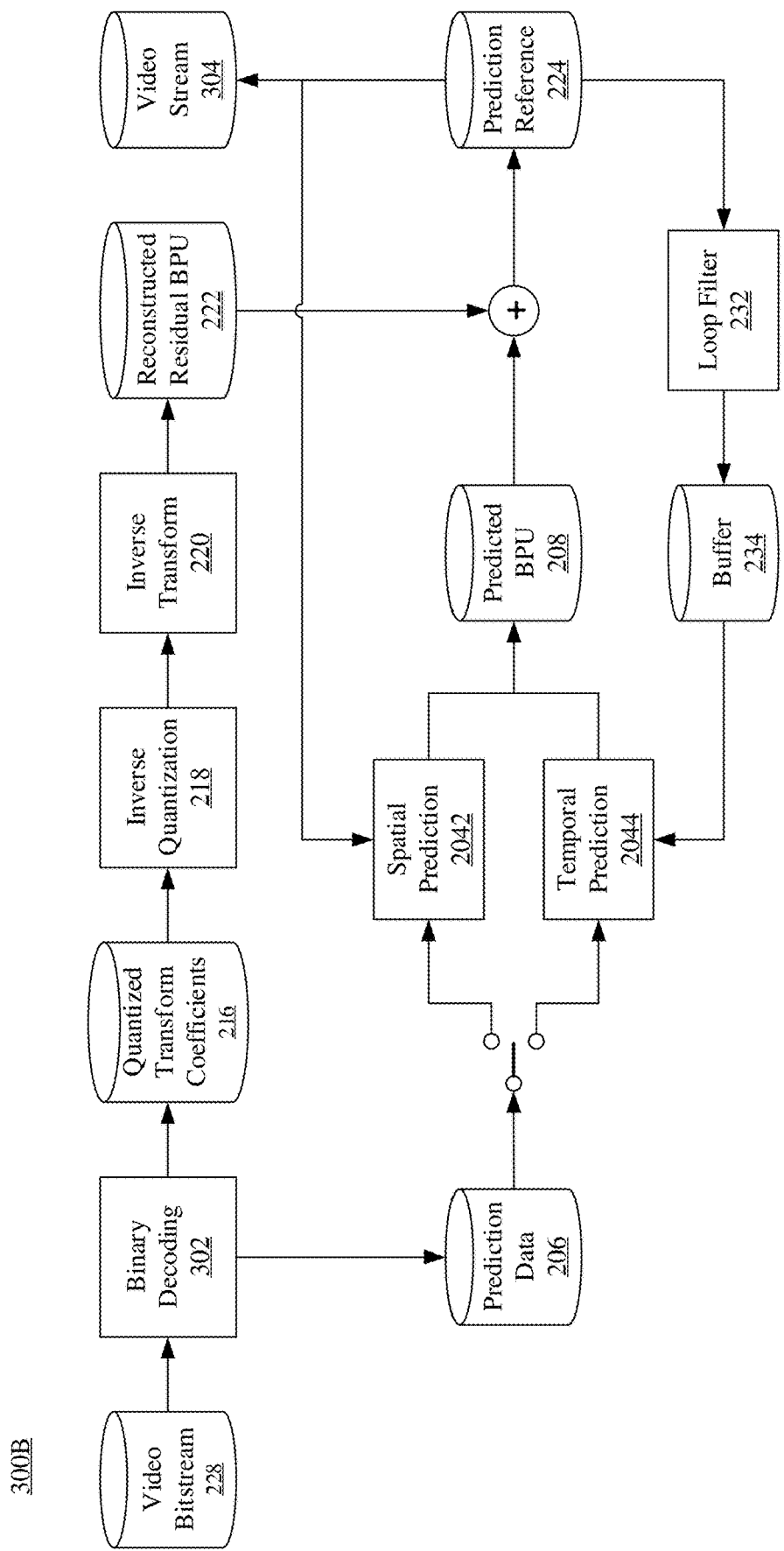
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU.

Figure 4:
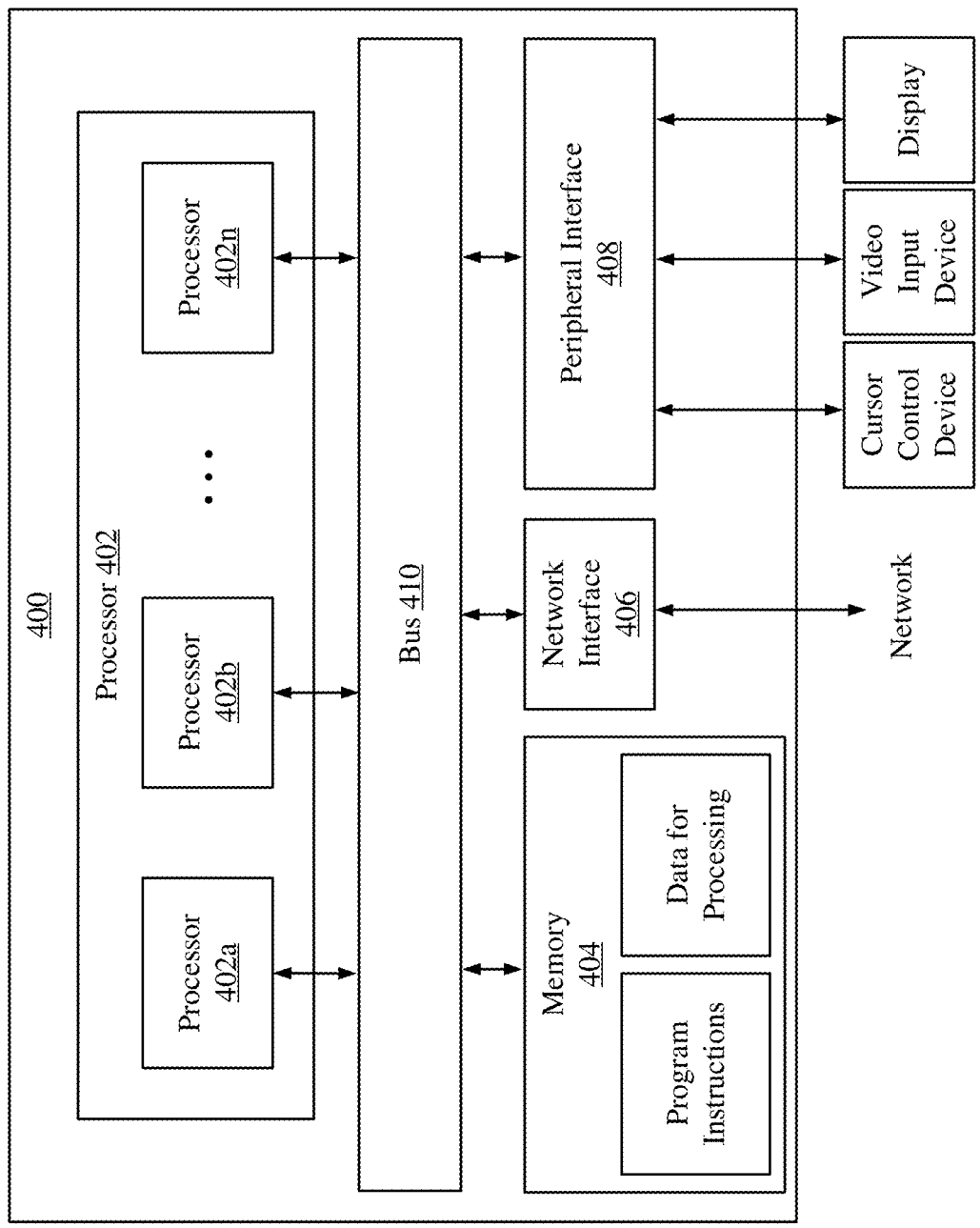
FIG. 4 is a block diagram of an exemplary apparatus for encoding or decoding a video, according to some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

Cross-component prediction can exploit the correlation between different color components. Cross-component prediction can remove the redundancy between two color components to increase the compression ratio. As a luma component has more texture information when compared to chroma in natural videos, usually the luma component is encoded firstly and then the chroma component is predicted based on the reconstructed luma component. Taking AVS3 for example, a two-step cross-component prediction mode (TSCPM) is adopted in which the chroma samples are predicted based on the reconstructed luma samples of the same CU by using a linear model as follows:

$$\text{pred\_}C(i,j) = \alpha \cdot \text{rec\_}L'(i,j) + \beta, \quad \text{(Eq. 1)}$$

where pred_$C(i,j)$ denotes an un-down-sampled predicted chroma samples in the current CU, rec_$L'(i,j)$ denotes a reconstructed luma samples of the same CU, $\alpha$ is a first parameter and $\beta$ is a second parameter. For 4:2:0 color format videos where each of the two chroma components has half of sample numbers of luma component in both horizontal and vertical dimension, pred_$C(i,j)$ is down-sampled in both dimensions to produce a predicted chroma sample pred_$C'(i,j)$.

Parameters of $\alpha$ and $\beta$ are derived from the reconstructed neighboring luma samples and chroma samples of the current CU. A linear model is firstly derived based on the relationship between neighboring reconstructed luma samples and the corresponding neighboring reconstructed chroma samples, and then the linear model is applied to the reconstructed luma samples of the current CU to predict the value of chroma samples of the current CU. To simplify the derivation of $\alpha$ and $\beta$, taking AVS3 as an example, only 4 sample pairs consisting of one neighboring reconstructed luma sample and the corresponding neighboring reconstructed chroma sample are used. Generally, there are three different methods to obtain these 4 sample pairs. In a first method, two of the sample pairs are from the above neighboring reconstructed samples and the other two of sample pairs are from the left neighboring reconstructed samples when both above neighboring block and left neighboring block are available. If only the above neighboring block is available, all of these 4 sample pairs are from the above neighboring reconstructed samples. If only the left neighboring block is available, all of these 4 sample pairs are from the left neighboring reconstructed samples. If both above and left neighboring blocks are unavailable, $\alpha$ is set to 0 and $\beta$ is set to 1<<(Bitdepth-1), and there is no need to get these 4 sample pairs.

In a second method, all of these 4 samples pairs are from the above neighboring reconstructed samples if above neighboring block is available. If the above neighboring block is unavailable, $\alpha$ is set to 0 and $\beta$ is set to 1<<(Bitdepth-1), and there is no need to get 4 sample pairs.

In a third method, all of these 4 sample pairs are from left neighboring reconstructed samples if the left neighboring block is available. If the left neighboring block is unavailable, $\alpha$ is set to 0 and $\beta$ is set to 1<<(Bitdepth-1), and there is no need to get 4 sample pairs.

When obtaining the neighboring reconstructed luma sample, for 4:2:0 color format, because of the un-equality of the luma number and the chroma number, the neighboring reconstructed luma samples are down-sampled to generate the down-sampled luma sample, which is corresponding to the chroma sample. After obtaining the 4 sample pairs, these 4 sample pairs are sorted according to the value of luma sample, and then the two bigger pairs and the two smaller pairs are averaged, respectively, to generate two averaged sample pairs. These two averaged sample pairs are used to derive the linear model parameters $\alpha$ and $\beta$.

In TSCPM, both two chroma components Cb and Cr are predicted from the luma component Y based on a linear model as follows:

$$\text{pred\_}Cb = \alpha_1 \cdot \text{rec\_}L' + \beta_1 \quad \text{(Eq. 2)}$$

$$\text{pred\_}Cr = \alpha_2 \cdot \text{rec\_}L' + \beta_2 \quad \text{(Eq. 3)}$$

However, for intra prediction, the reconstruction of the samples of three components within a block are usually sequentially performed. Consequently, when Cr component is being reconstructed, both Y component and Cb component have already been reconstructed. Thus, the prediction of Cr can not only be based on Y component, but can also be based on Cb component.

In AVS3, prediction from multiple cross-components (PMC) can utilize the information of both Y and Cb components to improve Cr prediction. The prediction of Cr is shown as follows:

$$\text{pred}\_C' = f_{downsample}(\text{pred}\_C) = f_{downsample}(A \times \text{rec}\_L' + B) \quad \text{(Eq. 4)}$$

$$\text{pred}\_Cr' = \text{pred}\_C' - \text{rec}\_Cb' \quad \text{(Eq. 5)}$$

where rec_L' denotes the reconstruction samples of Y components and pred_C is an intermediate sample block (e.g., an intermediate variable in derivation) that has the same dimension as the luma coding block, pred_C' represents the down-sampled samples of pred_C, rec_Cb' is the reconstruction samples of Cb component, and pred_Cr' is the predicted samples of Cr component. $f_{downsample}()$ is the down-sampling filter of which the down-sampling ratio is depending on the color format of the videos. In the videos of color format 4:2:0, $f_{downsample}$ performs 2:1 down-sampling on both horizontal and vertical dimension; in the videos of color format 4:2:2, $f_{downsample}$ performs 2:1 down-sampling on horizontal dimension and 1:1 down-sampling on vertical dimension; in the videos of color format 4:4:4, $f_{downsample}$ performs 1:1 down-sampling on both horizontal and vertical dimension. A and B are two parameters that are derived based on the linear model parameter of TSCPM as follows:

$$A = \alpha_1 + \alpha_2 \quad \text{(Eq. 6)}$$

$$B = \beta_1 + \beta_2 \quad \text{(Eq. 7)}$$

Since there are three methods to get the neighboring reconstructed samples to derive the linear model parameters in TSCPM, there are also three methods to derive the parameters A and B in PMC.

Figure 5A:
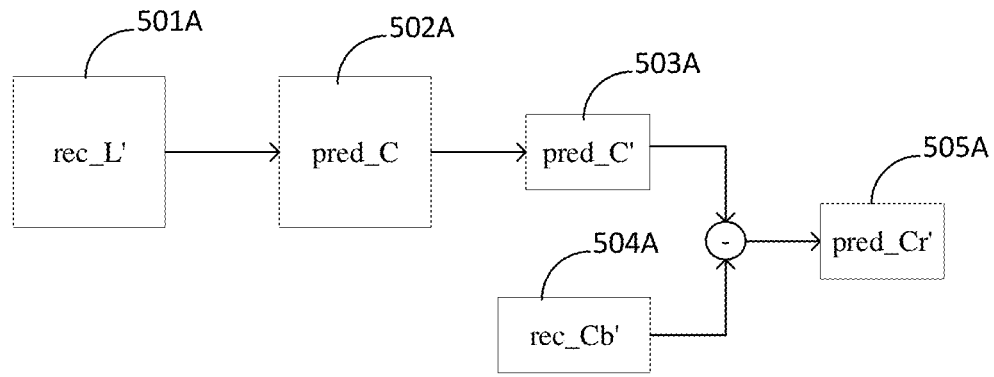
FIG. 5A is a schematic diagram illustrating an exemplary flow chart of prediction from multiple cross-components (PMC), according to some embodiments of the present disclosure.

FIG. 5A is a schematic diagram illustrating an exemplary flow chart of prediction from multiple cross-components (PMC), according to some embodiments of the present disclosure. As shown in FIG. 5A, in PMC, the pred_Cr' 505A is obtained by subtracting the rec_Cb' 504A from the pred_C' 503A. The pred_C' 503A is obtained based on the pred_C 502A, and the pred_C 502A is calculated using rec_L' 501A.

Figure 5B:
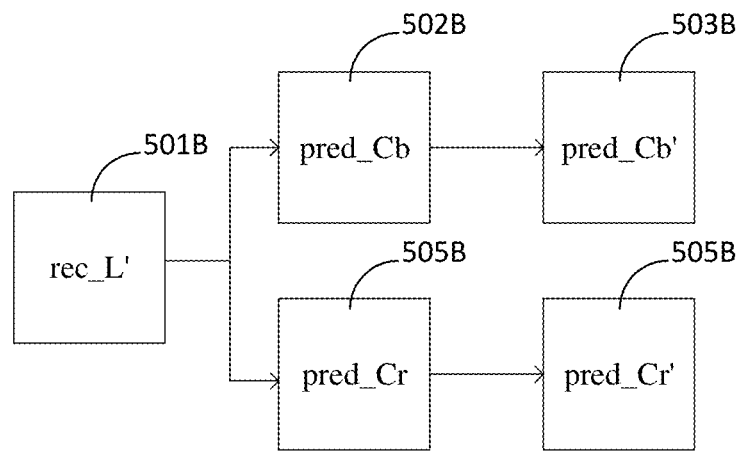
FIG. 5B is a schematic diagram illustrating an exemplary flow chart of two step cross-component prediction mode (TSCPM), according to some embodiments of the present disclosure.

FIG. 5B is a schematic diagram illustrating an exemplary flow chart of two step cross-component prediction mode (TSCPM), according to some embodiments of the present disclosure. As shown in FIG. 5B, in TSCPM, the pred_Cr' 503B and the pred_Cr' 505B are obtained respectively from the pred_Cb 502B and the pred_Cr 504B which are obtained from the rec_L' 501B.

After prediction, the residuals are calculated in the encoder side and transmitted in the bitstream after transform (e.g., transform 212 in FIG. 2A and FIG. 2B) and quantization (e.g., quantization 214 in FIG. 2A and FIG. 2B). In the decoder side, the reconstructed residuals are produced by inverse quantizing and inverse transforming the residuals parsed from the bitstream (e.g., inverse quantization 218 and inverse transform 220 in FIG. 3A and FIG. 3B). And the reconstructed sample value can be generated by adding reconstructed residuals to the prediction value. After sample reconstruction, the sample value can be further filtered by in-loop filter, like de-blocking filter, sample adaptive offset and adaptive loop filter, to get the final output sample value.

To code the residuals of chroma component, a flag called coded transform block pattern (ctp) is signaled in the bitstream for each chroma component to indicate whether the current block of the current chroma component has non-zero residuals or not. When the flag is equal to 0, indicating that the current block of the current chroma component doesn't have non-zero residuals, that is, there is no residuals for the current block of the current chroma component, the residual coding is skipped. When the flag is equal 1, indicating that the current block of the current chroma component has non-zero residuals, the residual information is coded.

For the Cr blocks, ctp flag is also signaled when PMC is applied. For the residuals of the block predicted with PMC, the ctp flag is signaled to indicate whether the current Cr block has non-zero residuals or not.

For the PMC, for example in AVS3, by combining Eq. 4 to Eq. 7, the prediction value of Cr samples is derived as follows:

$$\text{pred}\_Cr' = f_{downsample}[(\alpha_1 + \alpha_2) \cdot \text{rec}\_L' + (\beta_1 + \beta_2)] - \text{rec}\_Cb' \quad \text{(Eq. 8)}$$

by substitution with Eq. 2, $$\text{pred}\_Cr' = f_{downsample}[(\alpha_2 \cdot \text{rec}\_L' + \beta_2) + (\alpha_1 \cdot \text{rec}\_L' + \beta_1)] - \text{rec}\_Cb' = f_{downsample}[(\alpha_2 \cdot \text{rec}\_L' + \beta_2)] + \text{pred}\_Cb' - \text{rec}\_Cb' = f_{downsample}[(\alpha_2 \cdot \text{rec}\_L' + \beta_2)] - (\text{rec}\_Cb' - \text{pred}\_Cb') = f_{downsample}[(\alpha_2 \cdot \text{rec}\_L' + \beta_2)] - \text{resi}\_Cb' \quad \text{(Eq. 9)}$$

where resi_Cb' is the residual of Cb component having a value that is equal to the difference between reconstructed value and prediction value of Cb samples (e.g., rec_Cb'−pred_Cb'), and ($\alpha_2 \cdot \text{rec}\_L' + \beta_2$) is the prediction value of Cr samples in TSCPM. Thus, on top of TSCPM, PMC further improves the prediction of Cr component by subtracting the residuals of Cb from the original prediction values of Cr component. Assumption of PMC is that the residuals of Cr samples are opposite with the residuals of Cb samples.

However, this assumption is not always applicable. Depending on the content of the videos, the color characteristics of the picture varies. For some blocks, the residuals of Cr component are positively correlated with residuals of Cb component while for some blocks the residuals of Cr component is negatively correlated with residuals of Cb component. And even for the blocks of which the Cb and Cr residuals are negatively correlated, the averaged amplitude of Cr residuals may not be equal to that of Cb component. Therefore, PMC may not work in these cases.

In order to overcome the deficiencies of the assumption, in some embodiments of the present disclosure, multiple models are used for PMC.

Figure 6:
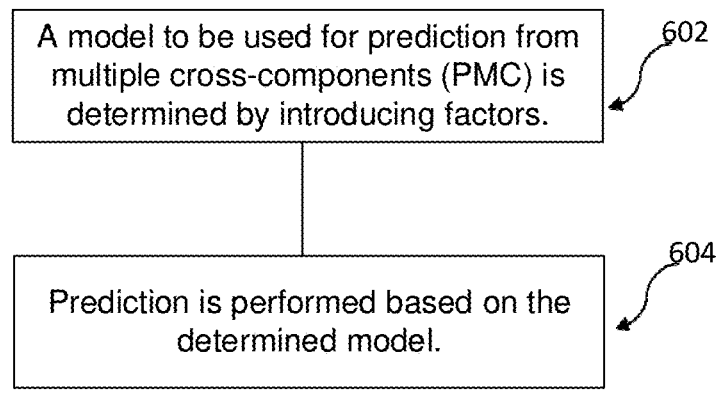
FIG. 6 illustrates a flow-chart of an exemplary method for video processing in PMC, according to some embodiments of the disclosure.

FIG. 6 illustrates a flow-chart of an exemplary method 600 for video processing in PMC, according to some embodiments of the disclosure. Method 600 can be performed by an encoder (e.g., by process 200A of FIG. 2A or 200B of FIG. 2B) or performed by one or more software or hardware components of an apparatus (e.g., apparatus 400 of FIG. 4). For example, one or more processors (e.g., processor 402 of FIG. 4) can perform method 600. In some embodiments, method 600 can be implemented by a computer program product, embodied in a computer-readable medium, including computer-executable instructions, such as program code, executed by computers (e.g., apparatus 400 of FIG. 4). Referring to FIG. 6, method 600 may include the following steps 602 and 604.

At step 602, a model to be used for prediction from multiple cross-components (PMC) is determined by combining two models with scaling factors. For example, scaling factors are introduced in the calculation of combined model parameter A and B to better fit to the correlation between Cb and Cr components. Therefore, the model used for PMC may vary with different values of the factor, and an appropriate model may be applied.

In some embodiments, A and B can be derived as follows:

$$A = k_1 \times \alpha_1 + k_2 \times \alpha_2 \quad \text{(Eq. 10)}$$

$$B = k_1 \times \beta_1 + k_2 \times \beta_2 \quad \text{(Eq. 11)}$$

where $k_1$ and $k_2$ are the scaling factors of the model. For example, $k_1$ can be set to 0.75, and $k_2$ can be set to 0.5. $k_1$ and $k_2$ are used to represent the relationship between $\alpha_1$ and $\alpha_2$, $\beta_1$ and $\beta_2$. $\alpha_1$ and $\beta_1$ can be parameters of a first linear model, and $\alpha_2$ and $\beta_2$ can be the parameters of a second linear model.

In some embodiments, a normalization is further performed on A and B, therefore, $k_2$ can be set to 1. Thus, A and B can be derived as follows:

$$A = k \times \alpha_1 + \alpha_2 \quad \text{(Eq. 10a)}$$

$$B = k \times \beta_1 + \beta_2 \quad \text{(Eq. 11a)}$$

With introduction of a scaling factor k, the prediction of Cr is obtained based on a combined linear model as follows:

$$\text{pred\_Cr'} = f_{downsample}(A \times \text{rec\_L'} + B) - k \times \text{rec\_Cb'} \quad \text{(Eq. 12)}$$

To simplify the calculation complexity for the cases when k is a non-integer number, such as 0.5, 0.75, etc., Eq. 10a and Eq. 11a can be derived as Eq. 10b and Eq. 11b:

$$A = (m \times \alpha_1 + p)/n + \alpha_2 \quad \text{(Eq. 10b)}$$

$$B = (m \times \beta_1 + p)/n + \beta_2 \quad \text{(Eq. 11b)}$$

and the Eq. 12 can be derived as Eq. 13:

$$\text{pred\_Cr'} = f_{downsample}(A \times \text{rec\_L'} + B) - (m \times \text{rec\_Cb'} + p)/n \quad \text{(Eq. 13)}$$

wherein m and n are two integers and the quotient of m being divided by n is close or equal to k. "/" is an integer division and p is the rounding offset with a value equal to half of n. In some embodiments, when n is a power of 2, "/" can be replaced by a right shift operation.

In some embodiments, to reduce the calculation complexity, parameter A and B are also derived to be integers and thereby a bit shift operation can be introduced. The Eq. 12 and Eq. 13 can be reformatted as Eq. 12a and Eq. 13a:

$$\text{pred\_Cr'} = f_{downsample}((A \times \text{rec\_L'} >> \text{ishift}) + B) - k \times \text{rec\_Cb'} \quad \text{(Eq. 12a)}$$

$$\text{pred\_Cr'} = f_{downsample}((A \times \text{rec\_L'} >> \text{ishift}) + B) - (m \times \text{rec\_Cb'} + p)/n \quad \text{(Eq. 13a)}$$

wherein ishift is a bit shift number, and the value of ishift is a non-negative integer.

In some embodiments, the prediction value can be obtained without down-sampling. That is, $f_{downsample}(\ )$ can be removed from Eq. 12, Eq. 13, Eq. 12a and Eq. 13a In an example, $k_1$ is equal to 0.75 and $k_2$ is equal to 1. Considering rounding calculation, A is equal to $((3\alpha_1+2)/4+\alpha_2)$ and B is equal to $((3\beta_1+2)/4+\beta_2)$. After derivation of A and B, pred_C' is produced by calculation with a linear model with parameters A and B as shown in Eq. 4 and then is down filtered. The prediction value of Cr sample, pred_Cr', can be derived according to the reconstructed value of Cb sample rec_Cb' and pred_C'. In this example, pred_Cr' is equal to pred_C'−(3rec_Cb'+2)/4.

In some embodiments, the factors $k_1$ and $k_2$ could be set to other values to determine an appropriate model.

At step 604, prediction of chroma components Cb and Cr is performed based on the determined model.

Figure 7:
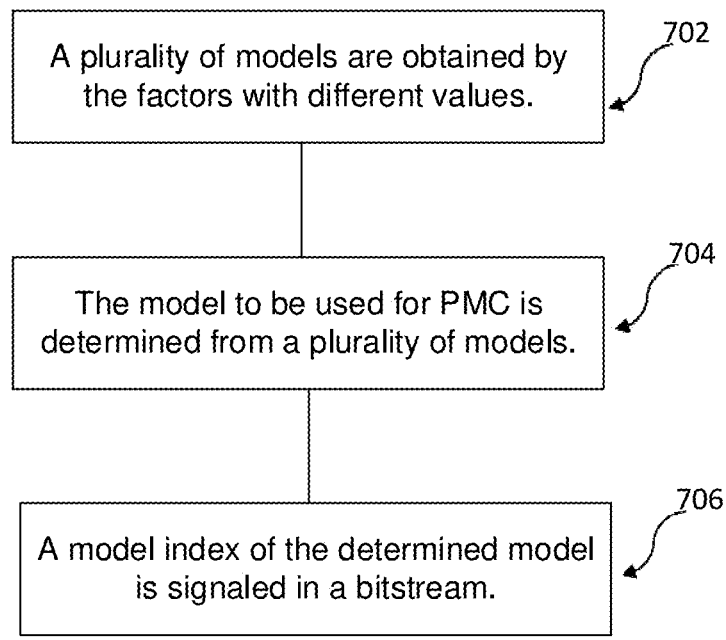
FIG. 7 illustrates a flow-chart of an exemplary method for multiple models processing, according to some embodiments of the disclosure.

FIG. 7 illustrates a flow-chart of an exemplary method 700 for multiple models processing, according to some embodiments of the disclosure. It is appreciated that method 700 can be part of step 602 in method 600 of FIG. 6. In some embodiment, the method 700 may further include the following steps 702-706.

At step 702, a plurality of models are obtained by the factors with different values. For example, a first model is obtained by setting $k_1$ to be 1 and $k_2$ to be −1; a second model is obtained by setting $k_1$ to be 0.5 and $k_2$ to be 1; and a third model is obtained by setting $k_1$ to be 0.75 and $k_2$ to be 2. The number of models is not limited.

At step 704, the model to be used for PMC is determined from the plurality of models. In another word, multiple models for PMC (e.g., multiple methods) can be used to derive PMC parameters A and B. In some embodiments, the model to be used can be determined based on a rate-distortion cost for a better performance. In other embodiments, the model to be used can also be determined by a preset rule. For example, the encoder selects the first model as the model to be used. The ways for model determination can be based on the performance of an encoder.

At step 706, a model index of the determined model is signaled in a bitstream, and the model index indicating the model used, therefore a model index is corresponding to certain factors of the model used. Therefore, the model used for PMC can be indicated by the index in the bitstream, which will facilitate the processing on the decoder side.

Then, a Cr sample can be predicted with the determined model on the encoder side.

In some embodiments, each block (or coding unit) has the plurality of models to derive parameters A and B. The encoder selects one of the models based on the rate-distortion cost. For example, A and B can be derived as Eq. 10a and Eq. 11a:

$$A = k \times \alpha_1 + \alpha_2 \quad \text{(Eq. 10a)}$$

$$B = k \times \beta_1 + \beta_2 \quad \text{(Eq. 11a)}$$

where k is a scaling factor of the model.

In some embodiments, two models can be applied. In a first example, k may be a negative value or a positive value. For example, k may be +1 or −1. That is, A is equal to $(\alpha_1+\alpha_2)$ and B is equal to $(\beta_1+\beta_2)$, or A is equal to $(-\alpha_1+\alpha_2)$ and B is equal to $(-\beta_1+\alpha_2)$. Two models are supported in this example. The value of k may be determined by the encoder and signaled in the bitstream and decoded by a decoder. After derivation of A and B, a pred_C' is produced by calculation with a linear model with parameters A and B as shown in Eq. 4 and down-sampled. The prediction value of Cr sample, pred_Cr', can be derived according to the reconstructed value of Cb sample, rec_Cb', and the value of k. When k is equal to 1, pred_Cr' is equal to pred_C'−rec_Cb'; when k is equal to −1, pred_Cr' is equal to pred_C'+rec_Cb'.

In a second example, k may be smaller or larger than 1. For example, k may be 0.5 or 2. That is, A is equal to $((\alpha_1+1)/2+\alpha_2)$ and B is equal to $((\beta_1+1)/2+\beta_2)$, or A is equal to $(2\alpha_1+\alpha_2)$ and B is equal to $(2\beta_1+\beta_2)$. Two models are supported in this example. The value of k may be determined by the encoder, then signaled in the bitstream and decoded by a decoder. After derivation of A and B, pred_C' is produced by calculation with a linear model with parameters A and B as shown in Eq. 4 and down-sampling. The prediction value of Cr sample, pred_Cr', can be derived according to the reconstructed value of Cb sample, rec_Cb', and the value of k. When k is equal to 0.5, pred_Cr' is equal to pred_C'−(rec_Cb'+1)/2; when k is equal to 2, pred_Cr' is equal to pred_C'−2·rec_Cb'.

In a third example, k may be smaller than 1. For example, k may be 0.75 or 0.25. That is, A is equal to $((3\alpha_1+2)/4+\alpha_2)$ and B is equal to $((3\beta_1+2)/4+\beta_2)$, or A is equal to $((\alpha_1+2)/4+\alpha_2)$ and B is equal to $((\beta_1+2)/4+\beta_2)$. Two models are supported in this example. The value of k may be determined by the encoder, then signaled in the bitstream and decoded by a decoder. After derivation of A and B, pred_C' is produced by calculation with a linear model with parameters A and B as shown in Eq. 4 and down-sampling. The prediction value of Cr sample, pred_Cr', can be derived according to the reconstructed value of Cb sample, rec_Cb', and the value of k. When k is equal to 0.75, pred_Cr' is equal to pred_C'−(3·rec_Cb'+2)/4; when k is equal to 0.25, pred_Cr' is equal to pred_C'−(rec_Cb'+2)/4.

In a fourth example, k may be smaller than 1 or equal to 1. For example, k may be 0.5 or 1. That is, A is equal to $((\alpha_1+1)/2+\alpha_2)$ and B is equal to $((\beta_1+1)/2+\beta_2)$, or A is equal to $(\alpha_1+\alpha_2)$ and B is equal to $(\beta_1+\beta_2)$. Two models are supported in this example. The value of k may be determined by the encoder, then signaled in the bitstream and decoded by a decoder. After derivation of A and B, a pred_C' is produced by calculation with a linear model with parameters A and B as shown in Eq. 4 and down-sampling. The prediction value of Cr sample, pred_Cr', can be derived according to the reconstructed value of Cb sample, rec_Cb', and the value of k. When k is equal to 0.5, pred_Cr' is equal to pred_C'−(rec_Cb'+1)/2; when k is equal to 1, pred_Cr' is equal to pred_C'−rec_Cb'.

In some embodiments, three or more models can be applied, and k may have three or more values. In a fifth example, k may be 0.5, 1 or 2. That is, A is equal to $((\alpha_1+1)/2+\alpha_2)$ and B is equal to $((\beta_1+1)/2+\beta_2)$, or A is equal to $(\alpha_1+\alpha_2)$ and B is equal to $(\beta_1+\beta_2)$, or A is equal to $(2\alpha_1+\alpha_2)$ and B is equal to $(2\beta_1+\beta_2)$. Three models are supported in this example. The value of k may be determined by the encoder and a corresponding model index is signaled in the bitstream and decoded by a decoder. After derivation of A and B, pred_C' is produced by calculation with a linear model with parameters A and B as shown in Eq. 4 and down-sampling. The prediction value of Cr sample, pred_Cr', can be derived according to the reconstructed value of Cb sample, rec_Cb', and the value of k. When k is equal to 0.5, pred_Cr' is equal to pred_C'−(rec_Cb'+1)/2; when k is equal to 1, pred_Cr' is equal to pred_C"−rec_Cb'; and when k is equal to 2, pred_Cr' is equal to pred_C'−2·rec_Cb'.

In a sixth example, k may be 0.5, 1 or −0.5. That is, A is equal to $((\alpha_1+1)/2+\alpha_2)$ and B is equal to $((\beta_1+1)/2+\beta_2)$, or A is equal to $(\alpha_1+\alpha_2)$ and B is equal to $(\beta_1+\beta_2)$, or A is equal to $(-(\alpha_1+1)/2+\alpha_2)$ and B is equal to $(-(\beta_1+1)/2+\beta_2)$. Three models are supported in this example. The value of k may be determined by the encoder, then signaled in the bitstream and decoded by a decoder. After derivation of A and B, pred_C' is produced by calculation with a linear model with parameters A and B as shown in Eq. 4 and down-sampled. The prediction value of Cr sample, pred_Cr', can be derived according to the reconstructed value of Cb sample, rec_Cb, and the value of k. When k is equal to 0.5, pred_Cr' is equal to pred_C'−(rec_Cb'+1)/2; when k is equal to 1, pred_Cr' is equal to pred_C'−rec_Cb'; and when k is equal to −0.5, pred_Cr' is equal to pred_C'+(rec_Cb'+1)/2.

In some embodiments, the model selection is performed at block level, which can give the encoder capability to choose the best one to fit the content of the current block, thus the coding performance is improved. However, block level multiple models request signaling of the model index for each block, which is a big signaling overhead and may reduce the coding performance.

In order to reduce the signaling amount, in some embodiment, the step 706 that a model index of the determined model is signaled in a bitstream can be skipped. In this case, the model index is not explicitly signaled in the bitstream but implicitly derived by the encoder and the decoder. For example, according to the statistics of the reconstructed values of Y component and Cb component, or the model index of neighboring coded blocks, the decoder directly determines the model index without decoding the model information from the bitstream. Therefore, the signalling overhead can be reduced.

In some embodiments of the present disclosure, the multiple models can be selected in a high level, for example in patch, slice, picture, or sequences level. The encoder determines the best model for the current patch, slice, picture or sequence and signals the model index in patch header, slice, picture header, or sequence header. The decoder decodes the Cr samples with the model indicated by the index signaled in the bitstream. All the models and the prediction of Cr sample described above may be used here.

In order to further improve the efficiency for multiple models processing, in some embodiments of the present disclosure, processing the multiple models at two levels can be used to make a good trade-off between the localization of the model and the signaling overhead of the model index. The models supported are selected and signaled at two different levels by the encoder. Then, on the decoder side, the decoder can derive the model by the joint indication of the syntax elements at these two different levels.

Figure 8:
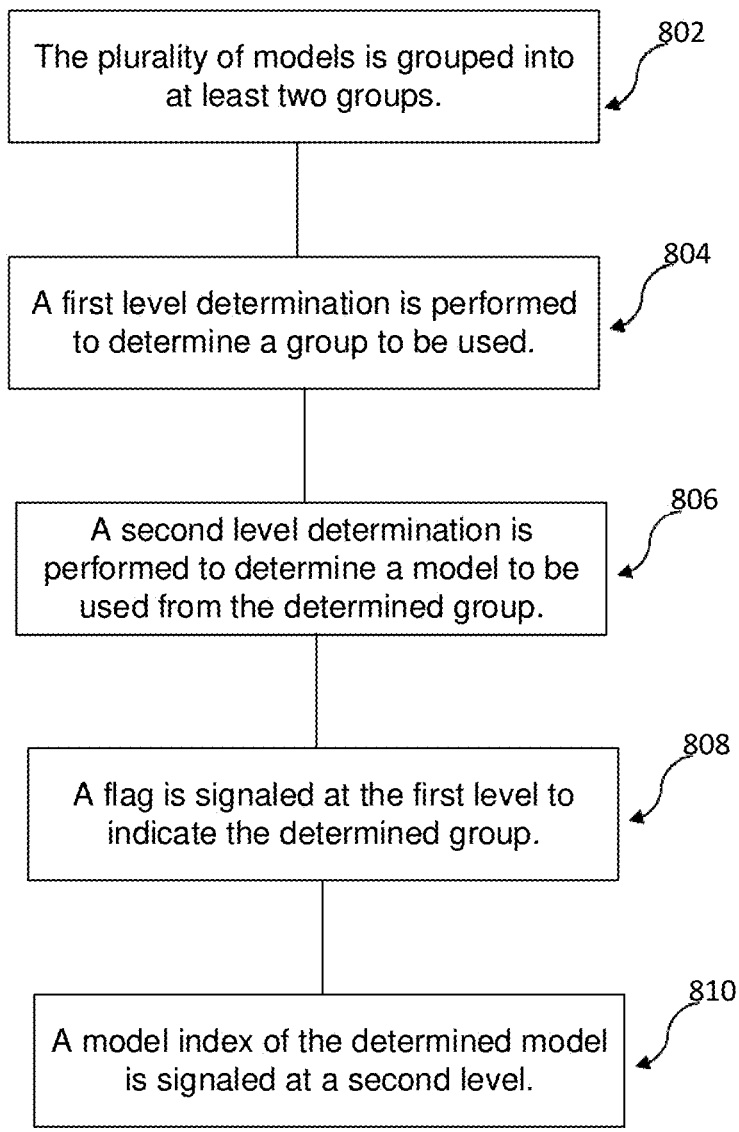
FIG. 8 illustrates a flow-chart of an exemplary method for multiple models processing at two levels, according to some embodiments of the disclosure.

FIG. 8 illustrates a flow-chart of an exemplary method 800 for multiple models processing at two levels, according to some embodiments of the present disclosure. It is appreciated that method 800 can be part of step 704 in method 700 of FIG. 7. In some embodiment, the method 800 may further include the following steps 802-810.

At step 802, the plurality of models is grouped into two or more groups. The models can be evenly divided into several groups, then each group has a same number of models. The models can be divided unevenly, then each group has different number of models. The number of models in each group is not limited. The division can be based on the value of the factor (e.g., k). For example, one group of the models with k being greater than a certain value (e.g., 1), and another group of the models with k being smaller than the certain value (e.g., 1). It is also possible for one model only being in one group or in several groups, which is not limited.

At step 804, a first level determination is performed to determine a group to be used. The first level determination is at group level, a group to be used is determined. For example, if the model to be used is determined with k being greater than 1, the group of models with k being greater than 1 is determined.

At step 806, a second level determination is performed to determine a model to be used from the determined group. The second level determination is at model level, a model to be used is determined from the group determined. After the first level determination, fewer models are selected for the second determination. The efficiency of the model determination can be improved and the model index signaling overhead can be reduced. If there is only one model in the determined group, the model is determined as the model to be used. Therefore, the second level determination can be skipped and the signaling of the model index can also be skipped.

At step 808, a flag is signaled at the first level to indicate the determined group. With the flag, the decoder can easily locate the determined group for processing. The flag can be signaled at picture level, slice level, patch level, or sequence level. For the cases where more than two groups divided, an index can be signaled to indicate which group is selected.

At step 810 (e.g., at step 706), a model index of the determined model is signaled at a second level. The model used for PMC can be indicated by the index in the bitstream, which will facilitate the processing on the decoder side. The model index can be signaled at block level.

With the two-level processing, the efficiency for localization of the model is improved, while only one more flag/index is signaled.

In some embodiment, the two or more groups are two or more sub-sets. One model can be only contained in one sub-set. Each sub-set contains at least one model. For example, in a first example, there are 6 models with k equal to −0.5, −1, −2, 0.5, 1 and 2. The set of the models is divided into 2 sub-sets. The first sub-set contains −0.5, −1, −2 and the second sub-set contains 0.5, 1 and 2. The sub-set is determined and signaled at picture/patch/slcie level, and the model used for each block within the subset is determined and signaled at the block level. Therefore, a flag is signaled at a picture/patch/slice header to indicate whether positive subset or negative subset is selected. Then for each block, a model index is signaled to indicate which one of the three models in the determined subset is used for the current block. The derivation of parameters A and B and the prediction process of Cr samples is based on the value of k, as described above.

In a second example, there are 4 models with k equal to 0.5, 1, 1.5 and 2. The set of the models is divided into 2 sub-sets. The first sub-set contains 0.5, 1 and the second sub-set contains 1.5 and 2. The sub-set is determined and signaled at picture/patch/slice level, and the model used for each block within the subset is determined and signaled at the block level. Therefore, a flag is signaled at picture/patch/slice header to indicate whether the first subset with k less than or equal to 1, or the second subset with k larger than 1 is selected. Then for each block, a model index is signaled to indicate which one of the two models in the determined subset is used for the current block. The derivation of parameters A and B and the prediction of Cr samples is based on the value of k, as described above.

In a third example, there are 3 models with k equal to 0.25, 0.75 and −0.5. The set of the models is divided into 2 sub-sets. The first sub-set contains 0.25, 0.75 and the second sub-set contains −0.5. The sub-set is determined and signaled at picture/patch/slice level, and the model used for each block within the subset is determined and signaled at the block level. Therefore, a flag is signaled at picture/patch/slice header to indicate whether first subset or the second subset is selected. Then for each block, if the first sub-set is selected, a model index is signaled to indicate which one of the two models in the determined subset is used for the current block. If the second sub-set is selected, the step 806 of a second level determination is performed to determine a model to be used from the determined group can be skipped. And there is no need to signal the model index since there is only one model in the second sub-set. The step 810 of signaling a model index at block level can also be skipped. The derivation of parameters A and B and the prediction of Cr samples is based on the value of k, as described above. The number of models in each subset is not the same in this example.

In some embodiments, the two or more groups can be two or more classes. One model can be categorized into to several classes. For example, in a fourth example, there are 2 models with k equal to 0.5 and 1. The models are categorized into 2 classes. The first class contains 0.5 and 1 and the second class contains 1. The class is determined and signaled at slice level, patch level or picture level, and the model used for each block within the class, if the number of the models in the currently determined class is more than 1, is determined and signaled at the block level. Therefore, a flag is signaled at slice header, patch header or picture header to indicate whether the first class or the second class is selected. If the first class is selected, for each block, a model index is signaled to indicate which one of the two models is used for the current block. If the second class is selected, the step 806 of a second level determination is performed to determine a model to be used from the determined group can be skipped. And there is no need to signal the model index since there is only one model in the second class. The step 810 of signaling a model index at block level can be skipped. The derivation of parameters A and B and the prediction process of Cr samples is based on the value of k, as described above. One model may be included by more than one class.

In some embodiments, the two or more groups are determined on picture level according to the picture type. For example, in a fifth example, there are 4 models with k equal to 0.5, 0.75, 1, and −0.25. The set of the models is divided into 2 sub-sets. The first sub-set contains 0.75 and −0.25, and the second sub-set contains 0.5 and 1. The sub-set is determined on picture level according to the picture type. For the first sub-set is used for I picture, and the second sub-set is used for P and B picture. So, there is no flag signaled in the picture header to determine the sub-set used for the current picture in this example. The step 808 of signaling a flag at picture level to indicate the determined group can be skipped. The model used for each block within the subset is determined and signaled at the block level. The derivation of parameters A and B and the prediction of Cr samples is based on the value of k, as described above.

In some embodiments, other combinations can be used.

Figure 9:
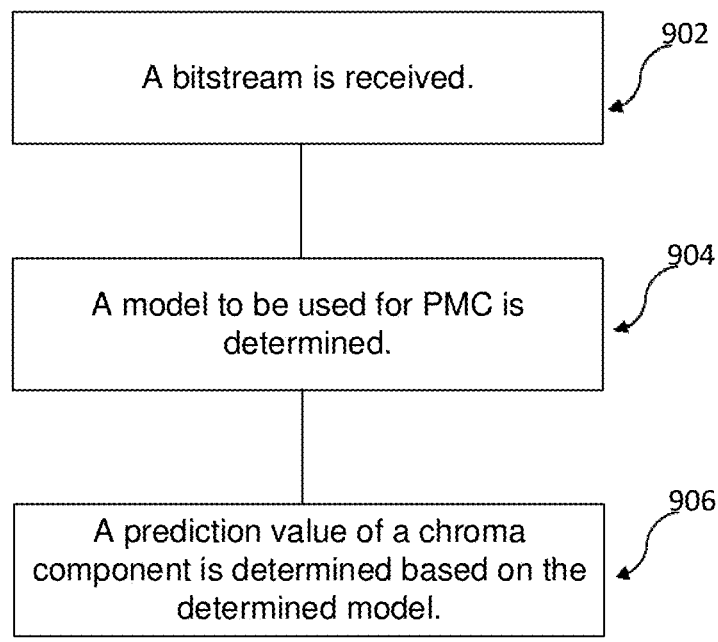
FIG. 9 illustrates a flow-chart of an exemplary method for video processing in PMC, according to some embodiments of the disclosure.

FIG. 9 illustrates a flow-chart of an exemplary method 900 for video processing in PMC, according to some embodiments of the disclosure. Method 900 can be performed by a decoder (e.g., by process 300A of FIG. 3A or 300B of FIG. 3B) or performed by one or more software or hardware components of an apparatus (e.g., apparatus 400 of FIG. 4). For example, one or more processors (e.g., processor 402 of FIG. 4) can perform method 900. In some embodiments, method 900 can be implemented by a computer program product, embodied in a computer-readable medium, including computer-executable instructions, such as program code, executed by computers (e.g., apparatus 400 of FIG. 4). Referring to FIG. 9, method 900 may include the following steps 902-906.

At step 902, a bitstream coded in PMC is received.

At step 904, a model to be used for PMC is determined, wherein the model to be used is with factors. For example, the factors are introduced in the calculation of PMC parameters A and B to better fit to the correlation between Cb and Cr components. In some embodiments, if a model index is signaled in the bitstream, then the step 904 may further include a step of determining the model to be used by decoding the model index from the bitstream. After decoding the model index, the values of the factors can be determined, then the parameters for the model to be used can be derived.

In some embodiments, there is no index signaled in the bitstream, and step 904 may further include a step that determining the model used according to the statistics of the reconstructed values of Y component and Cb component, or the model index of neighboring coded blocks. In this case, the factors for the model to be used can be derived according to the values of other components or from neighboring coded blocks.

In some embodiments, step 904 may include a step of determining the model according to the type of the patch or picture. For example, the values of k for different types of pictures can be pre-set, and shared with the encoder and decoder. In some embodiments, k is set to 1 for I picture, and to 0.5 for P or B picture. Then, if the current picture is I picture that is coded only with intra prediction, k is equal to 1. A is equal to $(\alpha_1+\alpha_2)$ and B is equal to $(\beta_1+\beta_2)$. After derivation of A and B, pred_C' is produced by calculation with a linear model with parameters A and B as shown in Eq. 4 and down-sampling. The prediction value of Cr sample, pred_Cr', is equal to pred__C'−rec_Cb'. If the current picture is P or B picture that is coded with intra prediction and inter prediction, k is 0.5. A is equal to $((\alpha_1+1)/2+\alpha_2)$ and B is equal to $((\beta_1+1)/2+\beta_2)$. After derivation of A and B, pred_C', is produced by calculation with a linear model with parameters A and B as shown in Eq. 4 and down-sampling. The prediction value of Cr sample, pred_Cr', is equal to pred_C'−(rec_Cb'+1)/2. In other embodiments, k can be set to other values for I picture and for P and B picture.

The parameters for the model can be derived according the determined model index.

In some embodiment, the models are selected and signaled at two different levels by the encoder. Then, the step 904 in method 900 further includes a step of determining the model by a joint indication of the syntax elements at the two different levels. In this case, a group to be used is determined by decoding the flag or index signaled at picture level first. Then, the model to be used is determined by decoding the model index at block level.

At step 906, a prediction value of a chroma component is determined based on the determined model. For example, the Cr samples can be decoded with the model used.

Since PMC improves the prediction of Cr component, the residuals of Cr block are reduced. However, in the current AVS3, ctp flag is still signaled in the bitstream. If most of Cr blocks has no non-zero residuals, signaling of ctp flag itself for each block consumes a non-negligible amount of bits. In some embodiments of present disclosure, a method for reducing the signaling amount is proposed.

Figure 10:
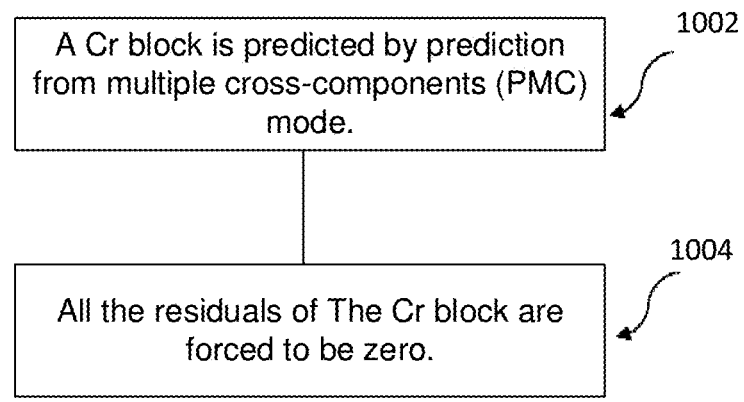
FIG. 10 illustrates a flow-chart of an exemplary method for video processing in PMC, according to some embodiments of the disclosure.

FIG. 10 illustrates a flow-chart of an exemplary method 1000 for video processing in PMC, according to some embodiments of the disclosure. Method 1000 can be performed by an encoder (e.g., by process 200A of FIG. 2A or 200B of FIG. 2B) or performed by one or more software or hardware components of an apparatus (e.g., apparatus 400 of FIG. 4). For example, one or more processors (e.g., processor 402 of FIG. 4) can perform method 1000. In some embodiments, method 1000 can be implemented by a computer program product, embodied in a computer-readable medium, including computer-executable instructions, such as program code, executed by computers (e.g., apparatus 400 of FIG. 4). Referring to FIG. 10, method 1000 may include the following steps 1002 and 1004.

At step 1002, a Cr block is predicted by prediction from multiple cross-components (PMC) mode.

At step 1004, all the residuals of the Cr block are forced to be zero. Since the residuals of Cr component are already reduced, there is no big distortion if all the residuals Cr blocks are forced to be zero, especially for the the blocks of which the prediction sample values are close to the original sample values. In some embodiments, a Cb block is predicted by prediction from multiple cross-components (PMC) mode, and all the residuals of the Cb block are forced to be zero.

Therefore, the step of signaling ctp flag and residuals for Cr block is skipped. Since all the residuals are forced to be zero, no ctp flag and residuals are signaled for the Cr block predicted by PMC mode. Therefore, the signaling is further saved.

Forcing the residual of Cr block to be zero may save the signaling of ctp flag and residuals for Cr component, but for blocks of which the prediction sample values are not close to the original sample values, it creates a large distortion. In some embodiments of the present disclosure, a high level ctp indication can be used to save the ctp signaling of each block.

Figure 11:
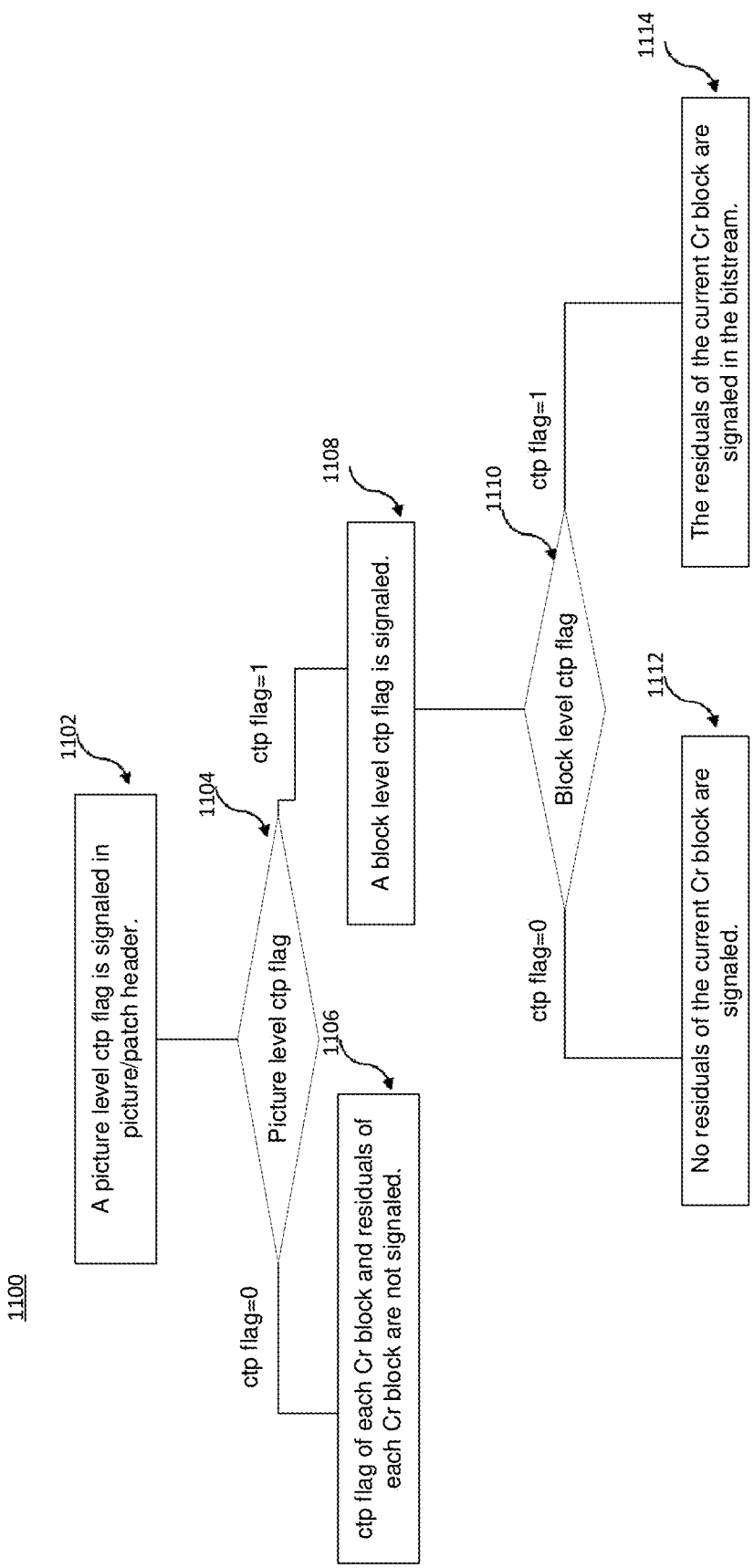
FIG. 11 illustrates a flow-chart of an exemplary method for video processing in PMC, according to some embodiments of the disclosure.

For example, the ctp flag of Cr block that is predicted by PMC mode is signaled in slice header, patch header or picture header. FIG. 11 illustrates a flow-chart of an exemplary method 1100 for signaling ctp flag at two levels, according to some embodiments of the disclosure. Method 1100 can be performed by an encoder (e.g., by process 200A of FIG. 2A or 200B of FIG. 2B) or performed by one or more software or hardware components of an apparatus (e.g., apparatus 400 of FIG. 4). For example, one or more processors (e.g., processor 402 of FIG. 4) can perform method 1100. In some embodiments, method 1100 can be implemented by a computer program product, embodied in a computer-readable medium, including computer-executable instructions, such as program code, executed by computers (e.g., apparatus 400 of FIG. 4). Referring to FIG. 11, method 1100 may include the following steps 1102 to 1114.

At step 1102, a first level ctp flag of Cr block that is predicted by PMC mode is signaled. The ctp flag can be at picture header, patch header or slice header, which is used to indicate whether there are non-zero residuals in current picture, current patch or current slice.

At step 1104, the value of the first level (e.g., picture level) ctp flag is determined. If the first level ctp flag is equal to 0, then each Cr block in the current picture/patch/slice that is predicted by PMC mode has no non-zero residuals. Therefore, at step 1106, a second level (e.g., block level) ctp flag and residuals of each Cr block are not signaled.

If this first level ctp flag is equal to 1 according to step 1104, then at step 1108, for each Cr block, a second level (e.g., block level) ctp flag is signaled to indicate whether the current Cr block has non-zero residual or not. At step 1110, the value of the second level ctp flag is determined. If the second level ctp flag is equal to 0 according to step 1110, at step 1112, no residuals of the current Cr block are signaled. If the second level ctp flag is equal to 1 according to step 1110, at step 1114, the residuals of the current Cr block are signaled in the bitstream. The second level ctp flag can be a block level ctp flag for indicating whether there are non-zero residuals in current block.

By signaling the ctp flags at two levels, the block level flag signaling and residuals signaling can be reduced significantly.

In some embodiments, the method 1100 may be combined with the method 700, method 800 or method 900, where multiple models with different values of k are supported.

In some embodiments, for the cases that the residuals are absent, that is, no residuals are signaled, the reconstructed values of Cr samples are derived equal to the improved prediction values of Cr samples. Therefore, the coding performance may be improved by saving the signaling.

Figure 12:
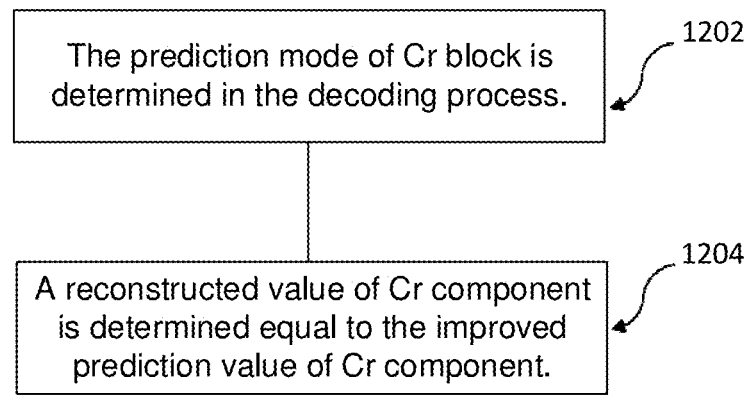
FIG. 12 illustrates a flow-chart of an exemplary method for video processing in PMC, according to some embodiments of the disclosure.

FIG. 12 illustrates a flow-chart of an exemplary method 1200 for video processing in PMC, according to some embodiments of the disclosure. Method 1200 can be performed by a decoder (e.g., by process 300A of FIG. 3A or 300B of FIG. 3B) or performed by one or more software or hardware components of an apparatus (e.g., apparatus 400 of FIG. 4). For example, one or more processors (e.g., processor 402 of FIG. 4) can perform method 1200. In some embodiments, method 1200 can be implemented by a computer program product, embodied in a computer-readable medium, including computer-executable instructions, such as program code, executed by computers (e.g., apparatus 400 of FIG. 4). Referring to FIG. 12, method 1200 may include the following steps 1202 and 1204.

At step 1202, the prediction mode of Cr block is determined. At the decoder, the prediction mode of Cr block is determined according to the received bitstream. Therefore, the decoding of ctp flag and residuals is skipped when the prediction mode of the current Cr block is coded with PMC mode. Since the prediction of Cr component is improved according to the embodiments of present disclosure, and in some embodiments, the ctp flag and residuals are not signaled in the bitstream, the decoding of ctp flag and residuals can be skipped to improve the processing performance.

At step 1204, a reconstructed value of Cr component is determined equal to the improved prediction value of Cr component. That is rec_Cr'=pred_Cr'.

PMC improves the prediction of a Cr block. But it is on top of TSCPM. Therefore, only when the Cb block is coded with TSCPM mode, PMC can be enabled to improve the prediction of Cr block. For other modes, PMC cannot be used.

In some embodiments of the present disclosure, the improvement of Cr prediction based on the reconstructed values of Cb component is not limited to the TSCPM mode, but extended to all the modes.

Figure 13:
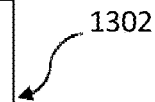
FIG. 13 illustrates a flow-chart of an exemplary method for video processing in PMC, according to some embodiments of the disclosure.

FIG. 13 illustrates a flow-chart of an exemplary method 1300 for video processing, according to some embodiments of the disclosure. Method 1300 can be performed by an encoder (e.g., by process 200A of FIG. 2A or 200B of FIG. 2B), a decoder (e.g., by process 300A of FIG. 3A or 300B of FIG. 3B) or performed by one or more software or hardware components of an apparatus (e.g., apparatus 400 of FIG. 4). For example, one or more processors (e.g., processor 402 of FIG. 4) can perform method 1300. In some embodiments, method 1300 can be implemented by a computer program product, embodied in a computer-readable medium, including computer-executable instructions, such as program code, executed by computers (e.g., apparatus 400 of FIG. 4). Referring to FIG. 13, method 1300 may include the following step 1302.

At step 1302, an updated prediction value of Cr component is determined by defining a linear relationship between an initial prediction value of Cr component and a residual value of Cb component The residual value of Cb component is equal to the difference between an initial prediction value of Cb component and a reconstructed value of Cb component. The initial prediction value of Cr component and the initial prediction value of Cb component are generated with any prediction mode. For example, according to Eq. 9, the improved prediction value of Cr samples can be derived as follows:

$$\text{pred\_}Cr' = \text{pred\_}Cr_0' + k \times (\text{pred\_}Cb_0' - \text{rec\_}Cb') = \text{pred\_}Cr_0' + k \times \text{resi\_}Cb' \quad \text{(Eq. 14)}$$

where pred_Cr' is the final improved prediction value of Cr sample, pred_$Cr_0$' is the initial prediction value of Cr sample, pred_$Cb_0$' is the prediction value of Cb sample, rec_Cb' is the reconstructed value of Cb sample, k the model factor. The improved prediction value of Cr component is calculated by defining a linear relationship between pred_$Cr_0$' and resi_$Cb_0$', where resi_Cb' is the residual of Cb component whose value is equal to the difference between pred_$Cb_0$' and rec_Cb'.

In some embodiments, pred_$Cr_0$' and pred_$Cb_0$' may be generated with any prediction mode. For example, pred_$Cr_0$' and pred_$Cb_0$' may be inter predicted values with normal inter mode, skip mode, direct mode or any other inter modes. Moreover, pred_$Cr_0$' and pred_$Cb_0$' may be intra predicted values with angular intra modes, bilinear intra modes, direct current (DC) modes, planar modes or any other intra modes. If inter prediction filtering or intra prediction filtering is applied, pred_$Cr_0$' and pred_$Cb_0$' may be values after the filtering or before the filtering.

After derivation of the improved prediction value of Cr samples, the reconstructed residuals values are added to the improved prediction values to get the reconstruction value of Cr samples. In some embodiment, for case of absence of residuals, the reconstructed values of Cr sample are equal to the improved prediction value of Cr samples.

The method 1300 may be combined with embodiments of method 700, method 800 or method 900 where the multiple models with different values of k are supported. The method 1300 may also be combined with embodiments where no ctp flag and residuals of Cr block are signaled. The method 1300 may also be combined with embodiments of method 1100, where a high level ctp flag is signaled to indicate the presence of residuals of Cr block.

In PMC, the prediction of Cr is improved based on the reconstructed values of the Y component and the Cb component. But the Cb component cannot be improved by the reconstructed values of Y component and Cr component. Thus, the quality of two chroma components is not balanced.

In some embodiments of the present disclosure, the prediction of Cb can be improved based on the reconstructed values of the Cr component.

Figure 14:
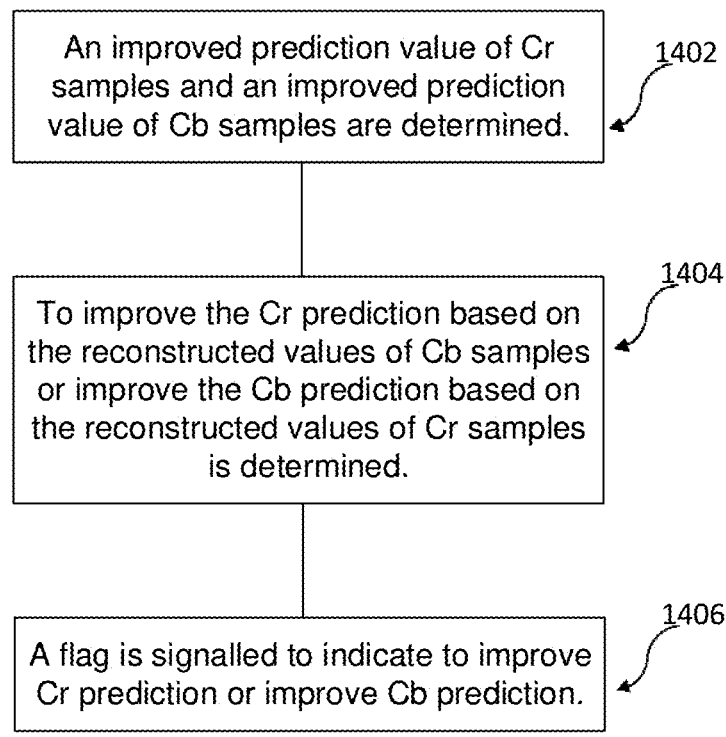
FIG. 14 illustrates a flow-chart of an exemplary method for video processing in PMC, according to some embodiments of the disclosure.

FIG. 14 illustrates a flow-chart of an exemplary method 1400 for video processing in PMC, according to some embodiments of the disclosure. Method 1400 can be performed by an encoder (e.g., by process 200A of FIG. 2A or 200B of FIG. 2B) or performed by one or more software or hardware components of an apparatus (e.g., apparatus 400 of FIG. 4). For example, one or more processors (e.g., processor 402 of FIG. 4) can perform method 1400. In some embodiments, method 1400 can be implemented by a computer program product, embodied in a computer-readable medium, including computer-executable instructions, such as program code, executed by computers (e.g., apparatus 400 of FIG. 4). Referring to FIG. 14, method 1400 may include the following steps 1402-1406.

At step 1402, an improved prediction value of Cr samples and an improved prediction value of Cb samples are determined. For example, the improved prediction value of Cr sample can be derived as Eq. 14, and the improved prediction value of Cb samples can be derived as follows:

$$\text{pred\_}Cb' = \text{pred\_}Cb_0' + k \times (\text{pred\_}Cr_0' - \text{rec\_}Cr') = \text{pred\_}Cb_0' + k \times \text{res\_}Cr' \quad \text{(Eq. 15)}$$

where pred_Cb' is the final improved prediction value of Cb sample, pred_$Cb_0$' is the initial prediction value of Cb sample, pred_$Cr_0'$ is the prediction value of Cr sample, rec_Cr' is the reconstructed value of Cr sample, resi_Cr' is the residual of Cr component whose value is equal to the difference between pred_$Cr_0'$ and rec_Cr', k is the model factor. For another example, the improved prediction value of Cr sample can be derived as Eq. 16, and the improved prediction value of Cb samples can be derived as Eq. 17:

$$\text{pred\_}Cr' = f_{downsample}[(k\alpha_1+\alpha_2) \times \text{rec\_}L' + (k\beta_1+\beta_2)] - k \times \text{rec\_}Cb' \quad \text{(Eq. 16)}$$

$$\text{pred\_}Cb' = f_{downsample}[(\alpha_1+k\alpha_2) \times \text{rec\_}L' + (\beta_1+k\beta_2)] - k \times \text{rec\_}Cr' \quad \text{(Eq. 17)}$$

where pred_Cr' and pred_Cb' are improved prediction value of Cr and Cb, rec_Cb' and rec_Cr' are the reconstruction value of Cb and Cr, rec_L' are the reconstruction value of Y, k is a scaling factor to combine two the linear models. $\alpha_1$ and $\beta_1$ are parameters of the linear model for derivation of Cb prediction sample values based on luma samples, and $\alpha_2$ and $\beta_2$ are parameters of the linear model for derivation of Cr prediction sample values based on luma samples.

At step 1404, to improve the Cr prediction based on the reconstructed values of Cb samples or improve the Cb prediction based on the reconstructed values of Cr samples is determined. As expressed in Eq. 14 to Eq. 17, Cr prediction or Cb prediction can be improved based on the other chroma component.

It is appreciated that, in some embodiments, the step 1404 can be performed prior to the step 1402, so that only one of improved Cr prediction value and improved Cb prediction value need to be determined in step 1402 If it is determined to improve the Cr prediction based on the reconstructed values of Cb samples in step 1404, an improved prediction value of Cr samples is determined in step 1402; if it is determined to improve the Cb prediction based on the reconstructed values of Cr samples in step 1404, an improved prediction value of Cb samples is determined in step 1402.

At step 1406, a flag is signalled to indicate whether to improve Cr prediction or improve Cb prediction. If the flag indicates to improve the Cr prediction, Eq. 14 or Eq. 16 is referred to; if the flag indicates to improve the Cb prediction, Eq. 15 or Eq. 17 is referred to. Thus, either Cr prediction or Cb prediction can be improved.

In some embodiments, the improvement of Cb prediction and Cr prediction is switched at block level. And the flag is signalled in the bitstream for each block.

In some embodiments, the improvements of Cb prediction and Cr prediction are switched at slice/patch/picture level. And the determination of improvement of Cr prediction or Cb prediction is based on the content feature of the current slice/patch/picture. A content feature can be a correlation coefficient between Cr component and Cb component. For some video contents, the Cr component and Cb component can be positive correlated. For some video contents, the Cr component and Cb component can be negative correlated. Since the flag is signaled at a high level, for example, at picture level or patch level, the flag signaling is saved.

In some embodiments, similar to method 1300, an improved prediction value of Cb component can be determined by defining a linear relationship between a prediction value of Cb component and a residual of Cr component, wherein the prediction value of Cb component and the prediction value of Cr component are generated with any prediction mode.

Figure 15:
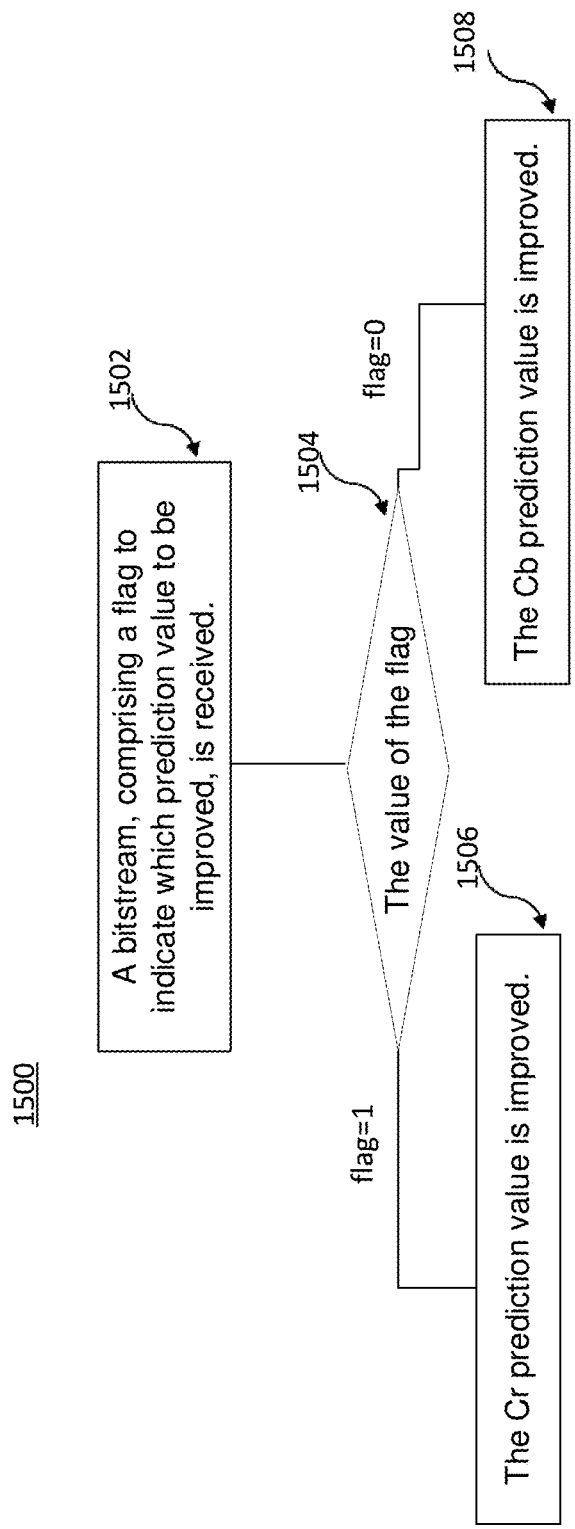
FIG. 15 illustrates a flow-chart of an exemplary method for video processing in PMC, according to some embodiments of the disclosure.

FIG. 15 illustrates a flow-chart of an exemplary method 1500 for video processing in PMC, according to some embodiments of the disclosure. Method 1500 can be performed by a decoder (e.g., by process 300A of FIG. 3A or 300B of FIG. 3B) or performed by one or more software or hardware components of an apparatus (e.g., apparatus 400 of FIG. 4). For example, one or more processors (e.g., processor 402 of FIG. 4) can perform method 1500. In some embodiments, method 1500 can be implemented by a computer program product, embodied in a computer-readable medium, including computer-executable instructions, such as program code, executed by computers (e.g., apparatus 400 of FIG. 4). Referring to FIG. 15, method 1500 may include the following steps 1502-1506.

At step 1502, a bitstream, comprising a flag for indicating to improve Cr prediction or improve Cb prediction, is received.

At step 1504, to improve Cr prediction or improve Cb prediction is determined based on the flag. For example, the flag being equal to 1 may indicate to improve the Cr prediction, and the flag being equal to 0 may indicate to improve the Cb prediction.

At step 1506, in response to the flag being equal to 1 at step 1504, the Cr prediction is improved. Then, the Cr prediction is improved with Eq. 14 or Eq. 16, for example.

At step 1508, in response to the flag being equal to 0 at step 1504, the Cb prediction is improved. Then, the Cb prediction is improved with Eq. 15 or Eq. 17, for example.

It is appreciated that while the present disclosure refers to various syntax elements providing inferences based on the value being equal to 0 or 1, the values can be configured in any way (e.g., 1 or 0) for providing the appropriate inference.

The embodiments may further be described using the following clauses:

1. A video encoding method, comprising:
   determining a set of parameters from a plurality of sets of parameters wherein the set of parameters includes a scaling factor;
   determining a predicted sample value of a first chroma component based on the set of the parameters, a reconstructed sample value of a luma component and a reconstructed sample value of a second chroma component; and
   signaling an index associated with the set of parameters in a bitstream.

2. The method of clause 1, wherein determining the predicted sample value of the first chroma component based on the set of parameters further comprises:
   determining a combined linear model based on the scaling factor, a first linear model, and a second linear model, wherein the first linear model, the second linear model and the combined linear model include a first parameter and a second parameter, respectively; and
   determining the predicted sample value of the first chroma component based on the combined linear model.

3. The method of clause 2, wherein determining the combined linear model based on the scaling factor, the first linear model and the second linear model comprises:
   determining the first parameter of the combined linear model as a linear combination of the first parameter of the first linear model and the first parameter of the second linear model with the scaling factor; and
   determining the second parameter of the combined linear model as a linear combination of the second parameter of the first linear model and the second parameter of the second linear model with the scaling factor.

4. The method of clause 3, wherein the first parameter of the combined linear model is determined based on following formula: A=k×α2+α1; and the second parameter of the combined linear model is determined based on following formula: B=k×β2+β1, wherein A is the first parameter of the combined linear model, B is the second parameter of the combined linear model, α1, α2 are the first parameters of the first linear model and the second linear model, β1, β2 are the second parameters of the first linear model and the second linear model, and k is the scaling factor.

5. The method of clause 3, wherein the first parameter of the combined linear model is determined based on following formula: A=(m×α2+p)/n+α1; and the second parameter of the combined linear model is determined based on following formula: B=(m×β2+p)/m+β1; wherein A is the first parameter of the combined linear model, B is the second parameter of the combined linear model, α1, α2 are the first parameters of the first linear model and the second linear model, β1, β2 are the second parameters of the first linear model and the second linear model, m and 1/n are two scaling factors, and p is a rounding offset.

6. The method of any one of clauses 2 to 5, wherein determining the predicted sample value of the first chroma component further comprises:
determining a first intermediate variable by adding a product of multiplying the first parameter of the combined linear model with the reconstructed sample value of the luma component and the second parameter of the combined linear model;
determining a second intermediate variable by scaling the reconstructed sample value of a second chroma component with the scaling factor; and
determining the predicted sample value of the first chroma component as a linear combination of the first intermediate variable and the second intermediate variable.

7. The method of clause 6, further comprising:
performing down-sampling on the first intermediate variable; and the predicted sample value of the first chroma component is determined as a linear combination of the down-sampled first intermediate variable and the second intermediate variable.

8. The method of clause 6 or 7, wherein determining the first intermediate variable by adding the product of multiplying the first parameter of the combined linear model with the reconstructed sample value of the luma component and the second parameter of the combined linear model further comprises:
performing a bit right shift process on the product; and the first intermediate variable is determined by adding a result of the bit right shift process performed and the second parameter of the combined linear model.

9. The method of any one of clauses 6 to 8, wherein the predicted sample value of the first chroma component is determined based on following formula:
pred_Cr'=fdownsample((A×rec_L'>>i)+B)−k×rec_Cb';
wherein pred_Cr' is the predicted sample value of the first chroma component, A is the first parameter of the combined linear model, B is the second parameter of the combined linear model, rec_L' is the reconstructed sample value of the luma component, rec_Cb' is the reconstructed sample value of the second chroma component, k is the scaling factor, i is a non-negative integer value indicating the bit right shift number, and fdownsample( ) denotes performing a down sampling process.

10. The method of any one of clauses 6 to 8, wherein the predicted sample value of the first chroma component is determined based on following formula:
pred_Cr'=fdownsample((A×rec_L'>>i)+B)−(m×rec_Cb'+p)/n; wherein pred_Cr' is the predicted sample value of the first chroma component, A is the first parameter of the combined linear model, B is the second parameter of the combined linear model, rec_L' is the reconstructed sample value of the luma component, rec_Cb' is the reconstructed sample value of the second chroma component, m and 1/n are two scaling factors, p is an rounding offset, i is a non-negative integer value indicating the bit right shift number, and fdownsample( ) denotes performing a down sampling process.

11. The method of clause 3 or 4, wherein the scaling factor is equal to 1, 0.5 or 2.

12. The method of any one of clauses 1 to 11, wherein signaling the index associated with the set of parameters in the bitstream further comprises:
signaling a first index in a first level and a second index in a second level, wherein the set of parameters is jointly indicated by the first index and the second index.

13. The method of clause 12, wherein the first level is a picture level and the second level is a coding unit (CU) level.

14. The method of clause 12 or 13, further comprising:
indicating a sub-set of the plurality of sets of parameters from the plurality of sets of parameters by the first index; and
indicating the set of parameters from the sub-set of the plurality of sets of parameters by the second index.

15. The method of one of any clauses 1 to 14, further comprising:
determining a reconstructed sample value of the first chroma component being equal to the predicted sample value of the first chroma component without signaling prediction residuals and a coded transform block pattern (CTP) flag of the first chroma component.

16. The method of one of any clauses 1 to 15, further comprising:
signaling a flag in the bitstream indicating whether a reconstructed sample value of the first chroma component being equal to the predicted sample value of the first chroma component;
in response to the flag indicating the reconstructed sample value of the first chroma component being equal to the predicted sample value of the first chroma component,
determining the reconstructed sample value of the first chroma component being equal to the predicted sample value of the first chroma component without signaling prediction residuals and a coded transform block pattern (CTP) flag of the first chroma component; and
in response to the flag indicating the reconstructed sample value of the first chroma component not being equal to the predicted sample value of the first chroma component,
determining whether the prediction residuals of the first chroma component for a current block are all zero,
in response to the prediction residuals of the first chroma component for the current block are all zero,
determining the reconstructed sample value of the first chroma component being equal to the predicted sample value of the first chroma component for the current block; and
signaling the coded transform block pattern (CTP) flag of the first chroma component for the current block with a value being equal to a first value, wherein the first value of the CTP flag indicates the prediction residuals of the first chroma component for the current block are all zero;
in response to the prediction residuals of the first chroma component for the current block are not all zero,
determining the reconstructed sample value of the first chroma component being equal to the predicted sample value of the first chroma component plus a reconstructed residual of the first chroma component for the current block;

signaling the coded transform block pattern (CTP) flag of the first chroma component for the current block with a value equal to a second value, wherein the second value of CTP flag indicates the prediction residuals of the first chroma component for the current block are not all zero; and signaling the prediction residuals of the first chroma component for the current block.

17. The method of one of any clauses 1 to 16, further comprising:

signaling a flag to indicate whether determining the predicted sample value of the first chroma component based on the set of the parameters, the reconstructed sample value of the luma component and the reconstructed sample value of the second chroma component or determining a predicted sample value of the second chroma component based on the set of the parameters, the reconstructed sample value of the luma component and a reconstructed sample value of the first chroma component;

in response to the flag indicating determining the predicted sample value of the first chroma component based on the set of the parameters, the reconstructed sample value of the luma component and the reconstructed sample value of the second chroma component, determining the reconstructed sample value of the luma component and the reconstructed sample value of the second chroma component first; and then determining the predicted sample value of the first chroma component;

in responses to the flag indicating determining the predicted sample value of the second chroma component based on the set of the parameters, the reconstructed sample value of the luma component and the reconstructed sample value of the first chroma component, determining the reconstructed sample value of the luma component and the reconstructed sample value of the first chroma component first; and then determining the predicted sample value of the second chroma component.

18. A video decoding method, comprising:

decoding an index from a video bitstream;

determining a set of parameters from a plurality of sets of parameters based on the index, wherein the set of parameters includes a scaling factor; and determining a predicted sample value of a first chroma component based on the set of the parameters, a reconstructed sample value of a luma component and a reconstructed sample value of a second chroma component.

19. The method of clause 18, wherein determining the predicted sample value of the first chroma component based on the set of parameters further comprises:

determining a combined linear model based on the scaling factor, a first linear model, and a second linear model, wherein the first linear model, the second linear model and the combined linear model include a first parameter and a second parameter, respectively; and determining the predicted sample value of the first chroma component based on the combined linear model.

20. The method of clause 19, wherein determining the combined linear model based on the scaling factor, the first linear model and the second linear model comprises:

determining the first parameter of the combined linear model as a linear combination of the first parameter of the first linear model and the first parameter of the second linear model with the scaling factor; and determining the second parameter of the combined linear model as a linear combination of the second parameter of the first linear model and the second parameter of the second linear model with the scaling factor.

21. The method of clause 20, wherein the first parameter of the combined linear model is determined based on following formula: $A=k\times\alpha 2+\alpha 1$; and the second parameter of the combined linear model is determined based on following formula: $B=k\times\beta 2+\beta 1$, wherein A is the first parameter of the combined linear model, B is the second parameter of the combined linear model, $\alpha 1$, $\alpha 2$ are the first parameters of the first linear model and the second linear model, $\beta 1$, $\beta 2$ are the second parameters of the first linear model and the second linear model, and k is the scaling factor.

22. The method of clause 20, wherein the first parameter of the combined linear model is determined based on following formula: $A=(m\times\alpha 2+p)/n+\alpha 1$; and the second parameter of the combined linear model is determined based on following formula: $B=(m\times\beta 2+p)/m+\beta 1$; wherein A is the first parameter of the combined linear model, B is the second parameter of the combined linear model, $\alpha 1$, $\alpha 2$ are the first parameters of the first linear model and the second linear model, $\beta 1$, $\beta 2$ are the second parameters of the first linear model and the second linear model, m and 1/n are scaling factors, and p is a rounding offset.

23. The method of any one of clauses 19 to 22, wherein determining the predicted sample value of the first chroma component further comprises:

determining a first intermediate variable by adding a product of multiplying the first parameter of the combined linear model with the reconstructed sample value of the luma component and the second parameter of the combined linear model;

determining a second intermediate variable by scaling the reconstructed sample value of a second chroma component with the scaling factor;

determining the predicted sample value of the first chroma component as a linear combination of the first intermediate variable and the second intermediate variable.

24. The method of clause 23, further comprising:

performing down-sampling on the first intermediate variable; and the predicted sample value of the first chroma component is determined as a linear combination of the down-sampled first intermediate variable and the second intermediate variable.

25. The method of clause 23 or 24, wherein determining the first intermediate variable by adding the product of multiplying the first parameter of the combined linear model with the reconstructed sample value of the luma component and the second parameter of the combined linear model further comprises:

performing a bit right shift process on the product; and the first intermediate variable is determined by adding a result of the bit right shift process performed and the second parameter of the combined linear model.

26. The method of any one of clauses 23 to 25, wherein the predicted sample value of the first chroma component is determined based on following formula:

pred_Cr'=fdownsample((A×rec_L'>>i)+B)−k×rec_Cb';

wherein pred_Cr' is the predicted sample value of the first chroma component, A is the first parameter of the combined linear model, B is the second parameter of the combined linear model, rec_L' is the reconstructed sample value of the luma component, rec_Cb' is the reconstructed sample value of the second chroma component, k is the scaling factor, i is a non-negative integer value indicating the bit right shift number, and fdownsample( ) denotes performing a down sampling process.

27. The method of any one of clauses 23 to 25, wherein the predicted sample value of the first chroma component is determined based on following formula:
pred_Cr'=fdownsample((A×rec_L'>>i)+B)−(m×rec_Cb'+p)/n; wherein pred_Cr' is the predicted sample value of the first chroma component, A is the first parameter of the combined linear model, B is the second parameter of the combined linear model, rec_L' is the reconstructed sample value of the luma component, rec_Cb' is the reconstructed sample value of the second chroma component, m and 1/n are two scaling factors, p is an rounding offset, i is a non-negative integer value indicating the bit right shift number, and fdownsample( ) denotes performing a down sampling process.

28. The method of clause 20 or 21, wherein the scaling factor is equal to 1, 0.5 or 2.

29. The method of any one of clauses 18 to 28, wherein decoding the index from the video bitstream further comprises:
decoding a first index in a first level and a second index in a second level; and
determining the set of parameters from the plurality of sets of parameters is based on the first index and the second index.

30. The method of clause 29, wherein the first level is a picture level and the second level is a coding unit (CU) level.

31. The method of clause 29 or 30, further comprising:
determining a sub-set of the plurality of sets of parameters from the plurality of sets of parameters based on the first index; and
determining the set of parameters from the sub-set of the plurality of sets of parameters based on the second index.

32. The method of any one of clauses 18 to 31, further comprising:
determining a reconstructed sample value of the first chroma component equal to the predicted sample value of the first chroma component for a current block without decoding prediction residuals and a coded transform block pattern (CTP) flag of the first chroma component.

33. The method of any one of clauses 18 to 32, further comprising:
decoding a flag from the bitstream wherein the flag indicates whether a reconstructed sample value of the first chroma component being equal to the predicted sample value of the first chroma component;
in response to the flag indicating the reconstructed sample value of the first chroma component being equal to the predicted sample value of the first chroma component,
determining the reconstructed sample value of the first chroma component being equal to the predicted sample value of the first chroma component without decoding prediction residuals and a coded transform block pattern (CTP) flag of the first chroma component; and
in response to the flag indicating the reconstructed sample value of the first chroma component not being equal to the predicted sample value of the first chroma component,
decoding the CTP flag of the first chroma component for the current block; and
determining whether the prediction residuals of the first chroma component for the current block are all zero based on the CTP flag,
in response to the CTP flag indicating the prediction residuals of the first chroma component for the current block are all zero,
determining the reconstructed sample value of the first chroma component being equal to the predicted sample value of the first chroma component for the current block without decoding the prediction residuals of the first chroma component for the current block;
in response to the prediction residuals of the first chroma component for the current block are not all zero,
decoding the prediction residuals of the first chroma component for the current block; and
determining the reconstructed sample value of the first chroma component being equal to the predicted sample value of the first chroma component plus a reconstructed residual of the first chroma component for the current block.

34. The method of any one of clauses 18 to 33, further comprising:
decoding a flag from the bitstream, wherein the flag indicates whether determining the predicted sample value of the first chroma component based on the set of the parameters, the reconstructed sample value of the luma component and the reconstructed sample value of the second chroma component or determining the predicted sample value of the second chroma component based on the set of the parameters, the reconstructed sample value of the luma component and the reconstructed sample value of the first chroma component;
in response to the flag indicating determining the predicted sample value of the first chroma component based on the set of the parameters, the reconstructed sample value of the luma component and the reconstructed sample value of the second chroma component,
determining the reconstructed sample value of the luma component and the reconstructed sample value of the second chroma component first; and then
determining the predicted sample value of the first chroma component; and
in response to the flag indicating determining the predicted sample value of the second chroma component based on the set of the parameters, the reconstructed sample value of the luma component and the reconstructed sample value of the first chroma component,
determining the reconstructed sample value of the luma component and the reconstructed sample value of the first chroma component first; and then
determining the predicted sample value of the second chroma component.

35. An apparatus for performing video data processing, the apparatus comprising:
a memory figured to store instructions; and
one or more processors configured to execute the instructions to cause the apparatus to perform:
determining a set of parameters from a plurality of sets of parameters wherein the set of parameters includes a scaling factor;
determining a predicted sample value of a first chroma component based on the set of the parameters, a reconstructed sample value of a luma component and a reconstructed sample value of a second chroma component; and
signaling an index associated with the set of parameters in a bitstream.

36. The apparatus of clause 35, wherein determining the predicted sample value of the first chroma component based on the set of parameters further comprises:
determining a combined linear model based on the scaling factor, a first linear model, and a second linear model, wherein the first linear model, the second linear model and the combined linear model include a first parameter and a second parameter, respectively; and
determining the predicted sample value of the first chroma component based on the combined linear model.

37. The apparatus of clause 36, wherein the one or more processors are further configured to execute the instructions to cause the apparatus to perform:
determining the first parameter of the combined linear model as a linear combination of the first parameter of the first linear model and the first parameter of the second linear model with the scaling factor; and
determining the second parameter of the combined linear model as a linear combination of the second parameter of the first linear model and the second parameter of the second linear model with the scaling factor.

38. The apparatus of clause 36, wherein the first parameter of the combined linear model is determined based on following formula: $A=k \times \alpha 2+\alpha 1$; and the second parameter of the combined linear model is determined based on following formula: $B=k \times \beta 2+\beta 1$, wherein A is the first parameter of the combined linear model, B is the second parameter of the combined linear model, $\alpha 1$, $\alpha 2$ are the first parameters of the first linear model and the second linear model, $\beta 1$, $\beta 2$ are the second parameters of the first linear model and the second linear model, and k is the scaling factor.

39. The apparatus of clause 36, wherein the first parameter of the combined linear model is determined based on following formula: $A=(m \times \alpha 2+p)/n+\alpha 1$; and the second parameter of the combined linear model is determined based on following formula: $B=(m \times \beta 2+p)/m+\beta 1$; wherein A is the first parameter of the combined linear model, B is the second parameter of the combined linear model, $\alpha 1$, $\alpha 2$ are the first parameters of the first linear model and the second linear model, $\beta 1$, $\beta 2$ are the second parameters of the first linear model and the second linear model, m and 1/n are two scaling factors, and p is a rounding offset.

40. The apparatus of any one of clauses 36 to 39, wherein the one or more processors are further configured to execute the instructions to cause the apparatus to perform:
determining a first intermediate variable by adding a product of multiplying the first parameter of the combined linear model with the reconstructed sample value of the luma component and the second parameter of the combined linear model;
determining a second intermediate variable by scaling the reconstructed sample value of a second chroma component with the scaling factor; and
determining the predicted sample value of the first chroma component as a linear combination of the first intermediate variable and the second intermediate variable.

41. The apparatus of clause 36, wherein the one or more processors are further configured to execute the instructions to cause the apparatus to perform:
performing down-sampling on the first intermediate variable; and the predicted sample value of the first chroma component is determined as a linear combination of the down-sampled first intermediate variable and the second intermediate variable.

42. The apparatus of clause 40 or 41, wherein the one or more processors are further configured to execute the instructions to cause the apparatus to perform:
performing a bit right shift process on the product; and the first intermediate variable is determined by adding a result of the bit right shift process performed and the second parameter of the combined linear model.

43. The apparatus of any one of clauses 40 to 42, wherein the predicted sample value of the first chroma component is determined based on following formula:
pred_Cr'=fdownsample((A×rec_L'>>i)+B)−k×rec_Cb';
wherein pred_Cr' is the predicted sample value of the first chroma component, A is the first parameter of the combined linear model, B is the second parameter of the combined linear model, rec_L' is the reconstructed sample value of the luma component, rec_Cb' is the reconstructed sample value of the second chroma component, k is the scaling factor, i is a non-negative integer value indicating the bit right shift number, and fdownsample( ) denotes performing a down sampling process.

44. The apparatus of any one of clauses 40 to 42, wherein the predicted sample value of the first chroma component is determined based on following formula:
pred_Cr'=fdownsample((A×rec_L'>>i)+B)−(m×rec_Cb'+p)/n; wherein pred_Cr' is the predicted sample value of the first chroma component, A is the first parameter of the combined linear model, B is the second parameter of the combined linear model, rec_L' is the reconstructed sample value of the luma component, rec_Cb' is the reconstructed sample value of the second chroma component, m and 1/n are two scaling factors, p is an rounding offset, i is a non-negative integer value indicating the bit right shift number, and fdownsample( ) denotes performing a down sampling process.

45. The apparatus of clause 37 or 38, wherein the scaling factor is equal to 1, 0.5 or 2.

46. The apparatus of any one of clauses 35 to 45, wherein the one or more processors are further configured to execute the instructions to cause the apparatus to perform:
signaling a first index in a first level and a second index in a second level, wherein the set of parameters is jointly indicated by the first index and the second index.

47. The apparatus of clause 46, wherein the first level is a picture level and the second level is a coding unit (CU) level.

48. The apparatus of clause 46 or 47, wherein the one or more processors are further configured to execute the instructions to cause the apparatus to perform:
indicating a sub-set of the plurality of sets of parameters from the plurality of sets of parameters by the first index; and
indicating the set of parameters from the sub-set of the plurality of sets of parameters by the second index.

49. The apparatus of one of any clauses 35 to 48, wherein the one or more processors are further configured to execute the instructions to cause the apparatus to perform:
determining a reconstructed sample value of the first chroma component being equal to the predicted sample value of the first chroma component without signaling prediction residuals and a coded transform block pattern (CTP) flag of the first chroma component.

50. The apparatus of one of any clauses 35 to 49, wherein the one or more processors are further configured to execute the instructions to cause the apparatus to perform:

signaling a flag in the bitstream indicating whether a reconstructed sample value of the first chroma component being equal to the predicted sample value of the first chroma component;

in response to the flag indicating the reconstructed sample value of the first chroma component being equal to the predicted sample value of the first chroma component, determining the reconstructed sample value of the first chroma component being equal to the predicted sample value of the first chroma component without signaling prediction residuals and a coded transform block pattern (CTP) flag of the first chroma component; and in response to the flag indicating the reconstructed sample value of the first chroma component not being equal to the predicted sample value of the first chroma component, determining whether the prediction residuals of the first chroma component for a current block are all zero, in response to the prediction residuals of the first chroma component for the current block are all zero, determining the reconstructed sample value of the first chroma component being equal to the predicted sample value of the first chroma component for the current block; and signaling the coded transform block pattern (CTP) flag of the first chroma component for the current block with a value being equal to a first value, wherein the first value of the CTP flag indicates the prediction residuals of the first chroma component for the current block are all zero;

in response to the prediction residuals of the first chroma component for the current block are not all zero, determining the reconstructed sample value of the first chroma component being equal to the predicted sample value of the first chroma component plus a reconstructed residual of the first chroma component for the current block;

signaling the coded transform block pattern (CTP) flag of the first chroma component for the current block with a value equal to a second value, wherein the second value of CTP flag indicates the prediction residuals of the first chroma component for the current block are not all zero; and signaling the prediction residuals of the first chroma component for the current block.

51. The apparatus of one of any clauses 35 to 50, wherein the one or more processors are further configured to execute the instructions to cause the apparatus to perform:

signaling a flag to indicate whether determining the predicted sample value of the first chroma component based on the set of the parameters, the reconstructed sample value of the luma component and the reconstructed sample value of the second chroma component or determining a predicted sample value of the second chroma component based on the set of the parameters, the reconstructed sample value of the luma component and a reconstructed sample value of the first chroma component;

in response to the flag indicating determining the predicted sample value of the first chroma component based on the set of the parameters, the reconstructed sample value of the luma component and the reconstructed sample value of the second chroma component, determining the reconstructed sample value of the luma component and the reconstructed sample value of the second chroma component first; and then determining the predicted sample value of the first chroma component;

in responses to the flag indicating determining the predicted sample value of the second chroma component based on the set of the parameters, the reconstructed sample value of the luma component and the reconstructed sample value of the first chroma component, determining the reconstructed sample value of the luma component and the reconstructed sample value of the first chroma component first; and then determining the predicted sample value of the second chroma component.

52. An apparatus for performing video data processing, the apparatus comprising:

a memory figured to store instructions; and one or more processors configured to execute the instructions to cause the apparatus to perform:

decoding an index from a video bitstream;

determining a set of parameters from a plurality of sets of parameters based on the index, wherein the set of parameters includes a scaling factor; and determining a predicted sample value of a first chroma component based on the set of the parameters, a reconstructed sample value of a luma component and a reconstructed sample value of a second chroma component.

53. The apparatus of clause 52, wherein the one or more processors are further configured to execute the instructions to cause the apparatus to perform:

determining a combined linear model based on the scaling factor, a first linear model, and a second linear model, wherein the first linear model, the second linear model and the combined linear model include a first parameter and a second parameter, respectively; and determining the predicted sample value of the first chroma component based on the combined linear model.

54. The apparatus of clause 53, wherein the one or more processors are further configured to execute the instructions to cause the apparatus to perform:

determining the first parameter of the combined linear model as a linear combination of the first parameter of the first linear model and the first parameter of the second linear model with the scaling factor; and determining the second parameter of the combined linear model as a linear combination of the second parameter of the first linear model and the second parameter of the second linear model with the scaling factor.

55. The apparatus of clause 54, wherein the first parameter of the combined linear model is determined based on following formula: $A=k\times\alpha2+\alpha1$; and the second parameter of the combined linear model is determined based on following formula: $B=k\times\beta2+\beta1$, wherein A is the first parameter of the combined linear model, B is the second parameter of the combined linear model, $\alpha1$, $\alpha2$ are the first parameters of the first linear model and the second linear model, $\beta1$, $\beta2$ are the second parameters of the first linear model and the second linear model, and k is the scaling factor.

56. The apparatus of clause 54, wherein the first parameter of the combined linear model is determined based on following formula: $A=(m\times\alpha2+p)/n+\alpha1$; and the second parameter of the combined linear model is determined based on following formula: $B=(m\times\beta2+p)/m+\beta1$; wherein A is the first parameter of the combined linear model, B is the second parameter of the combined linear model, $\alpha1$, $\alpha2$ are the first parameters of the first linear model and the second linear model, $\beta1$, $\beta2$ are the second parameters of the first linear model and the second linear model, m and 1/n are scaling factors, and p is a rounding offset.

57. The apparatus of any one of clauses 53 to 56, wherein the one or more processors are further configured to execute the instructions to cause the apparatus to perform:
determining a first intermediate variable by adding a product of multiplying the first parameter of the combined linear model with the reconstructed sample value of the luma component and the second parameter of the combined linear model;
determining a second intermediate variable by scaling the reconstructed sample value of a second chroma component with the scaling factor;
determining the predicted sample value of the first chroma component as a linear combination of the first intermediate variable and the second intermediate variable.

58. The apparatus of clause 57, wherein the one or more processors are further configured to execute the instructions to cause the apparatus to perform:
performing down-sampling on the first intermediate variable; and the predicted sample value of the first chroma component is determined as a linear combination of the down-sampled first intermediate variable and the second intermediate variable.

59. The apparatus of clause 57 or 58, wherein the one or more processors are further configured to execute the instructions to cause the apparatus to perform:
performing a bit right shift process on the product; and the first intermediate variable is determined by adding a result of the bit right shift process performed and the second parameter of the combined linear model.

60. The apparatus of any one of clauses 57 to 59, wherein the predicted sample value of the first chroma component is determined based on following formula:
pred_Cr'=fdownsample((A×rec_L'>>i)+B)−k×rec_Cb';
wherein pred_Cr' is the predicted sample value of the first chroma component, A is the first parameter of the combined linear model, B is the second parameter of the combined linear model, rec_L' is the reconstructed sample value of the luma component, rec_Cb' is the reconstructed sample value of the second chroma component, k is the scaling factor, i is a non-negative integer value indicating the bit right shift number, and fdownsample( ) denotes performing a down sampling process.

61. The apparatus of any one of clauses 57 to 59, wherein the predicted sample value of the first chroma component is determined based on following formula:
pred_Cr'=fdownsample((A×rec_L'>>i)+B)−(m×rec_Cb'+p)/n; wherein pred_Cr' is the predicted sample value of the first chroma component, A is the first parameter of the combined linear model, B is the second parameter of the combined linear model, rec_L' is the reconstructed sample value of the luma component, rec_Cb' is the reconstructed sample value of the second chroma component, m and 1/n are two scaling factors, p is an rounding offset, i is a non-negative integer value indicating the bit right shift number, and fdownsample( ) denotes performing a down sampling process.

62. The apparatus of clause 54 or 55, wherein the scaling factor is equal to 1, 0.5 or 2.

63. The apparatus of any one of clauses 52 to 62, wherein the one or more processors are further configured to execute the instructions to cause the apparatus to perform:
decoding a first index in a first level and a second index in a second level; and
determining the set of parameters from the plurality of sets of parameters is based on the first index and the second index.

64. The apparatus of clause 63, wherein the first level is a picture level and the second level is a coding unit (CU) level.

65. The apparatus of clause 63 or 64, wherein the one or more processors are further configured to execute the instructions to cause the apparatus to perform:
determining a sub-set of the plurality of sets of parameters from the plurality of sets of parameters based on the first index; and
determining the set of parameters from the sub-set of the plurality of sets of parameters based on the second index.

66. The apparatus of any one of clauses 52 to 65, wherein the one or more processors are further configured to execute the instructions to cause the apparatus to perform:
determining a reconstructed sample value of the first chroma component equal to the predicted sample value of the first chroma component for a current block without decoding prediction residuals and a coded transform block pattern (CTP) flag of the first chroma component.

67. The apparatus of any one of clauses 52 to 66, wherein the one or more processors are further configured to execute the instructions to cause the apparatus to perform:
decoding a flag from the bitstream wherein the flag indicates whether a reconstructed sample value of the first chroma component being equal to the predicted sample value of the first chroma component;
in response to the flag indicating the reconstructed sample value of the first chroma component being equal to the predicted sample value of the first chroma component,
determining the reconstructed sample value of the first chroma component being equal to the predicted sample value of the first chroma component without decoding prediction residuals and a coded transform block pattern (CTP) flag of the first chroma component; and
in response to the flag indicating the reconstructed sample value of the first chroma component not being equal to the predicted sample value of the first chroma component,
decoding the CTP flag of the first chroma component for the current block; and
determining whether the prediction residuals of the first chroma component for the current block are all zero based on the CTP flag,
in response to the CTP flag indicating the prediction residuals of the first chroma component for the current block are all zero,
determining the reconstructed sample value of the first chroma component being equal to the predicted sample value of the first chroma component for the current block without decoding the prediction residuals of the first chroma component for the current block;
in response to the prediction residuals of the first chroma component for the current block are not all zero,
decoding the prediction residuals of the first chroma component for the current block; and
determining the reconstructed sample value of the first chroma component being equal to the predicted sample value of the first chroma component plus a reconstructed residual of the first chroma component for the current block.

68. The apparatus of any one of clauses 52 to 67, wherein the one or more processors are further configured to execute the instructions to cause the apparatus to perform:

decoding a flag from the bitstream, wherein the flag indicates whether determining the predicted sample value of the first chroma component based on the set of the parameters, the reconstructed sample value of the luma component and the reconstructed sample value of the second chroma component or determining the predicted sample value of the second chroma component based on the set of the parameters, the reconstructed sample value of the luma component and the reconstructed sample value of the first chroma component;

in response to the flag indicating determining the predicted sample value of the first chroma component based on the set of the parameters, the reconstructed sample value of the luma component and the reconstructed sample value of the second chroma component, determining the reconstructed sample value of the luma component and the reconstructed sample value of the second chroma component first; and then determining the predicted sample value of the first chroma component; and in response to the flag indicating determining the predicted sample value of the second chroma component based on the set of the parameters, the reconstructed sample value of the luma component and the reconstructed sample value of the first chroma component, determining the reconstructed sample value of the luma component and the reconstructed sample value of the first chroma component first; and then determining the predicted sample value of the second chroma component.

69. A non-transitory computer readable medium that stores a set of instructions that is executable by one or more processors of an apparatus to cause the apparatus to initiate a method for performing video data processing, the method comprising:

determining a set of parameters from a plurality of sets of parameters wherein the set of parameters includes a scaling factor;

determining a predicted sample value of a first chroma component based on the set of the parameters, a reconstructed sample value of a luma component and a reconstructed sample value of a second chroma component; and signaling an index associated with the set of parameters in a bitstream.

70. The non-transitory computer readable medium of clause 69, wherein determining the predicted sample value of the first chroma component based on the set of parameters further comprises:

determining a combined linear model based on the scaling factor, a first linear model, and a second linear model, wherein the first linear model, the second linear model and the combined linear model include a first parameter and a second parameter, respectively; and determining the predicted sample value of the first chroma component based on the combined linear model.

71. The non-transitory computer readable medium of clause 70, wherein determining the combined linear model based on the scaling factor, the first linear model and the second linear model comprises:

determining the first parameter of the combined linear model as a linear combination of the first parameter of the first linear model and the first parameter of the second linear model with the scaling factor; and determining the second parameter of the combined linear model as a linear combination of the second parameter of the first linear model and the second parameter of the second linear model with the scaling factor.

72. The non-transitory computer readable medium of clause 71, wherein the first parameter of the combined linear model is determined based on following formula: $A = k \times \alpha_2 + \alpha_1$; and the second parameter of the combined linear model is determined based on following formula: $B = k \times \beta_2 + \beta_1$, wherein A is the first parameter of the combined linear model, B is the second parameter of the combined linear model, $\alpha_1$, $\alpha_2$ are the first parameters of the first linear model and the second linear model, $\beta_1$, $\beta_2$ are the second parameters of the first linear model and the second linear model, and k is the scaling factor.

73. The non-transitory computer readable medium of clause 72, wherein the first parameter of the combined linear model is determined based on following formula: $A = (m \times \alpha_2 + p)/n + \alpha_1$; and the second parameter of the combined linear model is determined based on following formula: $B = (m \times \beta_2 + p)/m + \beta_1$; wherein A is the first parameter of the combined linear model, B is the second parameter of the combined linear model, $\alpha_1$, $\alpha_2$ are the first parameters of the first linear model and the second linear model, $\beta_1$, $\beta_2$ are the second parameters of the first linear model and the second linear model, m and 1/n are two scaling factors, and p is a rounding offset.

74. The non-transitory computer readable medium of any one of clauses 70 to 73, wherein determining the predicted sample value of the first chroma component further comprises:

determining a first intermediate variable by adding a product of multiplying the first parameter of the combined linear model with the reconstructed sample value of the luma component and the second parameter of the combined linear model;

determining a second intermediate variable by scaling the reconstructed sample value of a second chroma component with the scaling factor; and determining the predicted sample value of the first chroma component as a linear combination of the first intermediate variable and the second intermediate variable.

75. The non-transitory computer readable medium of clause 74, the method further comprises:

performing down-sampling on the first intermediate variable; and the predicted sample value of the first chroma component is determined as a linear combination of the down-sampled first intermediate variable and the second intermediate variable.

76. The non-transitory computer readable medium of clause 74 or 75, wherein determining the first intermediate variable by adding the product of multiplying the first parameter of the combined linear model with the reconstructed sample value of the luma component and the second parameter of the combined linear model further comprises:

performing a bit right shift process on the product; and the first intermediate variable is determined by adding a result of the bit right shift process performed and the second parameter of the combined linear model.

77. The non-transitory computer readable medium of any one of clauses 74 to 76, wherein the predicted sample value of the first chroma component is determined based on following formula:

$\text{pred\_Cr}' = \text{fdownsample}((A \times \text{rec\_L}' >> i) + B) - k \times \text{rec\_Cb}'$;

wherein pred_Cr' is the predicted sample value of the first chroma component, A is the first parameter of the combined linear model, B is the second parameter of the combined linear model, rec_L' is the reconstructed sample value of the luma component, rec_Cb' is the reconstructed sample value of the second chroma component, k is the scaling factor, i is a non-negative integer value indicating the bit right shift number, and fdownsample( ) denotes performing a down sampling process.

78. The non-transitory computer readable medium of any one of clauses 74 to 76, wherein the predicted sample value of the first chroma component is determined based on following formula:

pred_Cr'=fdownsample((A×rec_L'>>i)+B)−(m×rec_Cb'+p)/n; wherein pred_Cr' is the predicted sample value of the first chroma component, A is the first parameter of the combined linear model, B is the second parameter of the combined linear model, rec_L' is the reconstructed sample value of the luma component, rec_Cb' is the reconstructed sample value of the second chroma component, m and 1/n are two scaling factors, p is an rounding offset, i is a non-negative integer value indicating the bit right shift number, and fdownsample( ) denotes performing a down sampling process.

79. The non-transitory computer readable medium of clause 71 or 72, wherein the scaling factor is equal to 1, 0.5 or 2.

80. The non-transitory computer readable medium of any one of clauses 69 to 79, wherein signaling the index associated with the set of parameters in the bitstream further comprises:

signaling a first index in a first level and a second index in a second level, wherein the set of parameters is jointly indicated by the first index and the second index.

81. The non-transitory computer readable medium of clause 80, wherein the first level is a picture level and the second level is a coding unit (CU) level.

82. The non-transitory computer readable medium of clause 80 or 81, wherein the method further comprises:

indicating a sub-set of the plurality of sets of parameters from the plurality of sets of parameters by the first index; and indicating the set of parameters from the sub-set of the plurality of sets of parameters by the second index.

83. The non-transitory computer readable medium of one of any clauses 69 to 82, wherein the method further comprises:

determining a reconstructed sample value of the first chroma component being equal to the predicted sample value of the first chroma component without signaling prediction residuals and a coded transform block pattern (CTP) flag of the first chroma component.

84. The non-transitory computer readable medium of one of any clauses 69 to 83, wherein the method further comprises:

signaling a flag in the bitstream indicating whether a reconstructed sample value of the first chroma component being equal to the predicted sample value of the first chroma component;

in response to the flag indicating the reconstructed sample value of the first chroma component being equal to the predicted sample value of the first chroma component, determining the reconstructed sample value of the first chroma component being equal to the predicted sample value of the first chroma component without signaling prediction residuals and a coded transform block pattern (CTP) flag of the first chroma component; and in response to the flag indicating the reconstructed sample value of the first chroma component not being equal to the predicted sample value of the first chroma component, determining whether the prediction residuals of the first chroma component for a current block are all zero, in response to the prediction residuals of the first chroma component for the current block are all zero, determining the reconstructed sample value of the first chroma component being equal to the predicted sample value of the first chroma component for the current block; and signaling the coded transform block pattern (CTP) flag of the first chroma component for the current block with a value being equal to a first value, wherein the first value of the CTP flag indicates the prediction residuals of the first chroma component for the current block are all zero;

in response to the prediction residuals of the first chroma component for the current block are not all zero, determining the reconstructed sample value of the first chroma component being equal to the predicted sample value of the first chroma component plus a reconstructed residual of the first chroma component for the current block;

signaling the coded transform block pattern (CTP) flag of the first chroma component for the current block with a value equal to a second value, wherein the second value of CTP flag indicates the prediction residuals of the first chroma component for the current block are not all zero; and signaling the prediction residuals of the first chroma component for the current block.

85. The non-transitory computer readable medium of one of any clauses 69 to 84, wherein the method further comprises:

signaling a flag to indicate whether determining the predicted sample value of the first chroma component based on the set of the parameters, the reconstructed sample value of the luma component and the reconstructed sample value of the second chroma component or determining a predicted sample value of the second chroma component based on the set of the parameters, the reconstructed sample value of the luma component and a reconstructed sample value of the first chroma component;

in response to the flag indicating determining the predicted sample value of the first chroma component based on the set of the parameters, the reconstructed sample value of the luma component and the reconstructed sample value of the second chroma component, determining the reconstructed sample value of the luma component and the reconstructed sample value of the second chroma component first; and then determining the predicted sample value of the first chroma component;

in responses to the flag indicating determining the predicted sample value of the second chroma component based on the set of the parameters, the reconstructed sample value of the luma component and the reconstructed sample value of the first chroma component, determining the reconstructed sample value of the luma component and the reconstructed sample value of the first chroma component first; and then determining the predicted sample value of the second chroma component.

86. A non-transitory computer readable medium that stores a set of instructions that is executable by one or more processors of an apparatus to cause the apparatus to initiate a method for performing video data processing, the method comprising:

decoding an index from a video bitstream;

determining a set of parameters from a plurality of sets of parameters based on the index, wherein the set of parameters includes a scaling factor; and determining a predicted sample value of a first chroma component based on the set of the parameters, a reconstructed sample value of a luma component and a reconstructed sample value of a second chroma component.

87. The non-transitory computer readable medium of clause 86, wherein determining the predicted sample value of the first chroma component based on the set of parameters further comprises:

determining a combined linear model based on the scaling factor, a first linear model, and a second linear model, wherein the first linear model, the second linear model and the combined linear model include a first parameter and a second parameter, respectively; and determining the predicted sample value of the first chroma component based on the combined linear model.

88. The non-transitory computer readable medium of clause 87, wherein determining the combined linear model based on the scaling factor, the first linear model and the second linear model comprises:

determining the first parameter of the combined linear model as a linear combination of the first parameter of the first linear model and the first parameter of the second linear model with the scaling factor; and determining the second parameter of the combined linear model as a linear combination of the second parameter of the first linear model and the second parameter of the second linear model with the scaling factor.

89. The non-transitory computer readable medium of clause 88, wherein the first parameter of the combined linear model is determined based on following formula: $A=k\times\alpha2+\alpha1$; and the second parameter of the combined linear model is determined based on following formula: $B=k\times\beta2+\beta1$, wherein A is the first parameter of the combined linear model, B is the second parameter of the combined linear model, $\alpha1$, $\alpha2$ are the first parameters of the first linear model and the second linear model, $\beta1$, $\beta2$ are the second parameters of the first linear model and the second linear model, and k is the scaling factor.

90. The non-transitory computer readable medium of clause 88, wherein the first parameter of the combined linear model is determined based on following formula: $A=(m\times\alpha2+p)/n+\alpha1$; and the second parameter of the combined linear model is determined based on following formula: $B=(m\times\beta2+p)/m+\beta1$; wherein A is the first parameter of the combined linear model, B is the second parameter of the combined linear model, $\alpha1$, $\alpha2$ are the first parameters of the first linear model and the second linear model, $\beta1$, $\beta2$ are the second parameters of the first linear model and the second linear model, m and 1/n are scaling factors, and p is a rounding offset.

91. The non-transitory computer readable medium of any one of clauses 87 to 90, wherein determining the predicted sample value of the first chroma component further comprises:

determining a first intermediate variable by adding a product of multiplying the first parameter of the combined linear model with the reconstructed sample value of the luma component and the second parameter of the combined linear model;

determining a second intermediate variable by scaling the reconstructed sample value of a second chroma component with the scaling factor;

determining the predicted sample value of the first chroma component as a linear combination of the first intermediate variable and the second intermediate variable.

92. The non-transitory computer readable medium of clause 91, wherein the method further comprises:

performing down-sampling on the first intermediate variable; and the predicted sample value of the first chroma component is determined as a linear combination of the down-sampled first intermediate variable and the second intermediate variable.

93. The non-transitory computer readable medium of clause 91 or 92, wherein determining the first intermediate variable by adding the product of multiplying the first parameter of the combined linear model with the reconstructed sample value of the luma component and the second parameter of the combined linear model further comprises: performing a bit right shift process on the product; and the first intermediate variable is determined by adding a result of the bit right shift process performed and the second parameter of the combined linear model.

94. The non-transitory computer readable medium of any one of clauses 91 to 93, wherein the predicted sample value of the first chroma component is determined based on following formula:

pred_Cr'=fdownsample$((A\times rec\_L'>>i)+B)-k\times rec\_Cb'$;

wherein pred_Cr' is the predicted sample value of the first chroma component, A is the first parameter of the combined linear model, B is the second parameter of the combined linear model, rec_L' is the reconstructed sample value of the luma component, rec_Cb' is the reconstructed sample value of the second chroma component, k is the scaling factor, i is a non-negative integer value indicating the bit right shift number, and fdownsample( ) denotes performing a down sampling process.

95. The non-transitory computer readable medium of any one of clauses 91 to 93, wherein the predicted sample value of the first chroma component is determined based on following formula:

pred_Cr'=fdownsample$((A\times rec\_L'>>i)+B)-(m\times rec\_Cb'+p)/n$; wherein pred_Cr' is the predicted sample value of the first chroma component, A is the first parameter of the combined linear model, B is the second parameter of the combined linear model, rec_L' is the reconstructed sample value of the luma component, rec_Cb' is the reconstructed sample value of the second chroma component, m and 1/n are two scaling factors, p is an rounding offset, i is a non-negative integer value indicating the bit right shift number, and fdownsample( ) denotes performing a down sampling process.

96. The non-transitory computer readable medium of clause 88 or 89, wherein the scaling factor is equal to 1, 0.5 or 2.

97. The non-transitory computer readable medium of any one of clauses 86 to 96, wherein decoding the index from the video bitstream further comprises:

decoding a first index in a first level and a second index in a second level; and determining the set of parameters from the plurality of sets of parameters is based on the first index and the second index.

98. The non-transitory computer readable medium of clause 97, wherein the first level is a picture level and the second level is a coding unit (CU) level.

99. The non-transitory computer readable medium of clause 97 or 98, wherein the method further comprises:
determining a sub-set of the plurality of sets of parameters from the plurality of sets of parameters based on the first index; and
determining the set of parameters from the sub-set of the plurality of sets of parameters based on the second index.

100. The non-transitory computer readable medium of any one of clauses 86 to 99, wherein the method further comprises:
determining a reconstructed sample value of the first chroma component equal to the predicted sample value of the first chroma component for a current block without decoding prediction residuals and a coded transform block pattern (CTP) flag of the first chroma component.

101. The non-transitory computer readable medium of any one of clauses 86 to 100, wherein the method further comprises:
decoding a flag from the bitstream wherein the flag indicates whether a reconstructed sample value of the first chroma component being equal to the predicted sample value of the first chroma component;
in response to the flag indicating the reconstructed sample value of the first chroma component being equal to the predicted sample value of the first chroma component,
determining the reconstructed sample value of the first chroma component being equal to the predicted sample value of the first chroma component without decoding prediction residuals and a coded transform block pattern (CTP) flag of the first chroma component; and
in response to the flag indicating the reconstructed sample value of the first chroma component not being equal to the predicted sample value of the first chroma component,
decoding the CTP flag of the first chroma component for the current block; and
determining whether the prediction residuals of the first chroma component for the current block are all zero based on the CTP flag,
in response to the CTP flag indicating the prediction residuals of the first chroma component for the current block are all zero,
determining the reconstructed sample value of the first chroma component being equal to the predicted sample value of the first chroma component for the current block without decoding the prediction residuals of the first chroma component for the current block;
in response to the prediction residuals of the first chroma component for the current block are not all zero,
decoding the prediction residuals of the first chroma component for the current block; and
determining the reconstructed sample value of the first chroma component being equal to the predicted sample value of the first chroma component plus a reconstructed residual of the first chroma component for the current block.

102. The non-transitory computer readable medium of any one of clauses 86 to 101, wherein the method further comprises:
decoding a flag from the bitstream, wherein the flag indicates whether determining the predicted sample value of the first chroma component based on the set of the parameters, the reconstructed sample value of the luma component and the reconstructed sample value of the second chroma component or determining the predicted sample value of the second chroma component based on the set of the parameters, the reconstructed sample value of the luma component and the reconstructed sample value of the first chroma component;
in response to the flag indicating determining the predicted sample value of the first chroma component based on the set of the parameters, the reconstructed sample value of the luma component and the reconstructed sample value of the second chroma component,
determining the reconstructed sample value of the luma component and the reconstructed sample value of the second chroma component first; and then
determining the predicted sample value of the first chroma component; and
in response to the flag indicating determining the predicted sample value of the second chroma component based on the set of the parameters, the reconstructed sample value of the luma component and the reconstructed sample value of the first chroma component,
determining the reconstructed sample value of the luma component and the reconstructed sample value of the first chroma component first; and then
determining the predicted sample value of the second chroma component.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A video encoding method, comprising:
    determining a set of parameters from a plurality of sets of parameters wherein the set of parameters includes a scaling factor;
    determining a predicted sample value of a first chroma component based on the set of the parameters, a reconstructed sample value of a luma component and a reconstructed sample value of a second chroma component; and
    signaling an index associated with the set of parameters in a bitstream, wherein determining the predicted sample value of the first chroma component further comprises:
        determining a first parameter of a combined linear model as a linear combination of a first parameter of a first linear model and a first parameter of a second linear model with the scaling factor;
        determining a second parameter of the combined linear model as a linear combination of a second parameter of the first linear model and a second parameter of the second linear model with the scaling factor; and
        determining the predicted sample value of the first chroma component based on the combined linear model;
    wherein the first parameter of the combined linear model is determined based on formula: A=(m×α2+p)/n+α1 and the second parameter of the combined linear model is determined based on formula: B=(m×β2+p)/n+β1, wherein A is the first parameter of the combined linear model, B is the second parameter of the combined linear model, α1, α2 are the first parameters of the first linear model and the second linear model, β1, β2 are the second parameters of the first linear model and the second linear model, m and 1/n are two scaling factors, and p is a rounding offset.

2. The method of claim 1, wherein determining the predicted sample value of the first chroma component further comprises:
    determining a first intermediate variable by adding a product of multiplying the first parameter of the combined linear model with the reconstructed sample value of the luma component and the second parameter of the combined linear model;
    determining a second intermediate variable by scaling the reconstructed sample value of a second chroma component with the scaling factor; and
    determining the predicted sample value of the first chroma component as a linear combination of the first intermediate variable and the second intermediate variable.

3. The method of claim 2, further comprising:
    performing down-sampling on the first intermediate variable; and the predicted sample value of the first chroma component is determined as a linear combination of the down-sampled first intermediate variable and the second intermediate variable.

4. The method of claim 2, wherein determining the first intermediate variable by adding the product of multiplying the first parameter of the combined linear model with the reconstructed sample value of the luma component and the second parameter of the combined linear model further comprises:
    performing a bit right shift process on the product; and the first intermediate variable is determined by adding a result of the bit right shift process performed and the second parameter of the combined linear model.

5. The method of claim 2, wherein the predicted sample value of the first chroma component is determined based on following formula:
    pred_Cr'=fdownsample((A×rec_L'>>i)+B)−(m×rec_Cb'+p)/n; wherein pred_Cr' is the predicted sample value of the first chroma component, A is the first parameter of the combined linear model, B is the second parameter of the combined linear model, rec_L' is the reconstructed sample value of the luma component, rec_Cb' is the reconstructed sample value of the second chroma component, m and 1/n are two scaling factors, p is an rounding offset, i is a non-negative integer value indicating the bit right shift number, and fdownsample( ) denotes performing a down sampling process.

6. The method of claim 1, wherein the scaling factor is equal to 1, 0.5 or 2.

7. The method of claim 1, wherein signaling the index associated with the set of parameters in the bitstream further comprises:
    signaling a first index in a first level and a second index in a second level, wherein the set of parameters is jointly indicated by the first index and the second index.

8. The method of claim 7, wherein the first level is a picture level and the second level is a coding unit (CU) level.

9. The method of claim 7, further comprising:
    indicating a sub-set of the plurality of sets of parameters from the plurality of sets of parameters by the first index; and
    indicating the set of parameters from the sub-set of the plurality of sets of parameters by the second index.

10. A video decoding method, comprising:
    decoding an index from a video bitstream;
    determining a set of parameters from a plurality of sets of parameters based on the index, wherein the set of parameters includes a scaling factor; and
    determining a predicted sample value of a first chroma component based on the set of the parameters, a reconstructed sample value of a luma component and a reconstructed sample value of a second chroma component, wherein determining the predicted sample value of the first chroma component further comprises:

determining a first parameter of a combined linear model as a linear combination of a first parameter of a first linear model and a first parameter of a second linear model with the scaling factor;

determining a second parameter of the combined linear model as a linear combination of a second parameter of the first linear model and a second parameter of the second linear model with the scaling factor; and determining the predicted sample value of the first chroma component based on the combined linear model;

wherein the first parameter of the combined linear model is determined based on formula: A=(m×α2+p)/n+α1 and the second parameter of the combined linear model is determined based on formula: B=(m×β2+p)/n+β1, wherein A is the first parameter of the combined linear model, B is the second parameter of the combined linear model, α1, α2 are the first parameters of the first linear model and the second linear model, β1, β2 are the second parameters of the first linear model and the second linear model, m and 1/n are two scaling factors, and p is a rounding offset.

11. The method of claim 10, wherein determining the predicted sample value of the first chroma component further comprises:

determining a first intermediate variable by adding a product of multiplying the first parameter of the combined linear model with the reconstructed sample value of the luma component and the second parameter of the combined linear model;

determining a second intermediate variable by scaling the reconstructed sample value of a second chroma component with the scaling factor;

determining the predicted sample value of the first chroma component as a linear combination of the first intermediate variable and the second intermediate variable.

12. The method of claim 11, further comprising:
performing down-sampling on the first intermediate variable; and the predicted sample value of the first chroma component is determined by a linear combination of the down-sampled first intermediate variable and the second intermediate variable.

13. The method of claim 11, wherein determining the first intermediate variable by adding the product of multiplying the first parameter of the combined linear model with the reconstructed sample value of the luma component and the second parameter of the combined linear model further comprises:

performing a bit right shift process on the product; and the first intermediate variable is determined by adding a result of the bit right shift process performed and the second parameter of the combined linear model.

14. The method of claim 11, wherein the predicted sample value of the first chroma component is determined based on following formula:

pred_Cr'=fdownsample((A×rec_L'>>i)+B)−k×rec_Cb';
wherein pred_Cr' is the predicted sample value of the first chroma component, A is the first parameter of the combined linear model, B is the second parameter of the combined linear model, rec_L' is the reconstructed sample value of the luma component, rec_Cb' is the reconstructed sample value of the second chroma component, k is the scaling factor, i is a non-negative integer value indicating the bit right shift number, and fdownsample( ) denotes performing a down sampling process.

15. The method of claim 11, wherein the predicted sample value of the first chroma component is determined based on following formula:

pred_Cr'=fdownsample((A×rec_L'>>i)+B)−(m×rec_Cb'+p)/n; wherein pred_Cr' is the predicted sample value of the first chroma component, A is the first parameter of the combined linear model, B is the second parameter of the combined linear model, rec_L' is the reconstructed sample value of the luma component, rec_Cb' is the reconstructed sample value of the second chroma component, m and 1/n are two scaling factors, p is an rounding offset, i is a non-negative integer value indicating the bit right shift number, and fdownsample( ) denotes performing a down sampling process.

16. The method of claim 10, wherein the scaling factor is equal to 1, 0.5 or 2.

17. The method of claim 10, wherein decoding the index from the video bitstream further comprises:

decoding a first index in a first level and a second index in a second level; and determining the set of parameters from the plurality of sets of parameters is based on the first index and the second index.

18. The method of claim 17, wherein the first level is a picture level and the second level is a coding unit (CU) level.

19. The method of claim 17, further comprising:
determining a sub-set of the plurality of sets of parameters from the plurality of sets of parameters based on the first index; and determining the set of parameters from the sub-set of the plurality of sets of parameters based on the second index.

20. The method of claim 10, further comprising:
determining a reconstructed sample value of the first chroma component equal to the predicted sample value of the first chroma component for a current block without decoding prediction residuals and a coded transform block pattern (CTP) flag of the first chroma component.

21. The method of claim 10, further comprising:
decoding a flag from the bitstream wherein the flag indicates whether a reconstructed sample value of the first chroma component being equal to the predicted sample value of the first chroma component;

in response to the flag indicating the reconstructed sample value of the first chroma component being equal to the predicted sample value of the first chroma component, determining the reconstructed sample value of the first chroma component being equal to the predicted sample value of the first chroma component without decoding prediction residuals and a coded transform block pattern (CTP) flag of the first chroma component; and in response to the flag indicating the reconstructed sample value of the first chroma component not being equal to the predicted sample value of the first chroma component, decoding the CTP flag of the first chroma component for the current block; and determining whether the prediction residuals of the first chroma component for the current block are all zero based on the CTP flag, in response to the CTP flag indicating the prediction residuals of the first chroma component for the current block are all zero, determining the reconstructed sample value of the first chroma component being equal to the predicted sample value of the first chroma component for the current block without decoding the prediction residuals of the first chroma component for the current block;
in response to the prediction residuals of the first chroma component for the current block are not all zero,
decoding the prediction residuals of the first chroma component for the current block; and
determining the reconstructed sample value of the first chroma component being equal to the predicted sample value of the first chroma component plus a reconstructed residual of the first chroma component for the current block.

22. The method of claim 10, further comprising:
decoding a flag from the bitstream, wherein the flag indicates whether determining the predicted sample value of the first chroma component based on the set of the parameters, the reconstructed sample value of the luma component and the reconstructed sample value of the second chroma component or determining the predicted sample value of the second chroma component based on the set of the parameters, the reconstructed sample value of the luma component and the reconstructed sample value of the first chroma component;
in response to the flag indicating determining the predicted sample value of the first chroma component based on the set of the parameters, the reconstructed sample value of the luma component and the reconstructed sample value of the second chroma component,
determining the reconstructed sample value of the luma component and the reconstructed sample value of the second chroma component first; and then
determining the predicted sample value of the first chroma component; and
in response to the flag indicating determining the predicted sample value of the second chroma component based on the set of the parameters, the reconstructed sample value of the luma component and the reconstructed sample value of the first chroma component,
determining the reconstructed sample value of the luma component and the reconstructed sample value of the first chroma component first; and then
determining the predicted sample value of the second chroma component.

23. An apparatus for performing video data processing, the apparatus comprising:
a memory figured to store instructions; and
one or more processors configured to execute the instructions to cause the apparatus to perform:
decoding an index from a video bitstream;
determining a set of parameters from a plurality of sets of parameters based on the index, wherein the set of parameters includes a scaling factor; and
determining a predicted sample value of a first chroma component based on the set of the parameters, a reconstructed sample value of a luma component and a reconstructed sample value of a second chroma component, wherein determining the predicted sample value of the first chroma component further comprises:
determining a first parameter of a combined linear model as a linear combination of a first parameter of a first linear model and a first parameter of a second linear model with the scaling factor;
determining a second parameter of the combined linear model as a linear combination of a second parameter of the first linear model and a second parameter of the second linear model with the scaling factor; and
determining the predicted sample value of the first chroma component based on the combined linear model;
wherein the first parameter of the combined linear model is determined based on formula: $A=(m \times \alpha 2 + p)/n + \alpha 1$ and the second parameter of the combined linear model is determined based on formula: $B=(m \times \beta 2 + p)/n + \beta 1$, wherein A is the first parameter of the combined linear model, B is the second parameter of the combined linear model, $\alpha 1$, $\alpha 2$ are the first parameters of the first linear model and the second linear model, $\beta 1$, $\beta 2$ are the second parameters of the first linear model and the second linear model, m and 1/n are two scaling factors, and p is a rounding offset.

24. The apparatus of claim 23, wherein the one or more processors are further configured to execute the instructions to cause the apparatus to perform:
decoding a first index in a first level and a second index in a second level, and
determining the set of parameters from the plurality of sets of parameters based on the first index and the second index.

25. The apparatus of claim 23, wherein the one or more processors are further configured to execute the instructions to cause the apparatus to perform:
determining a reconstructed sample value of the first chroma component equal to the predicted sample value of the first chroma component for a current block without decoding prediction residuals and a coded transform block pattern (CTP) flag of the first chroma component.

26. A non-transitory computer readable medium storing a bitstream of a video for processing according to a method comprising:
decoding an index from the bitstream;
determining a set of parameters from a plurality of sets of parameters based on the index, wherein the set of parameters includes a scaling factor; and
determining a predicted sample value of a first chroma component based on the set of the parameters, a reconstructed sample value of a luma component and a reconstructed sample value of a second chroma component, wherein determining the predicted sample value of the first chroma component further comprises:
determining a first parameter of a combined linear model as a linear combination of a first parameter of a first linear model and a first parameter of a second linear model with the scaling factor;
determining a second parameter of the combined linear model as a linear combination of a second parameter of the first linear model and a second parameter of the second linear model with the scaling factor;
determining the predicted sample value of the first chroma component based on the combined linear model;
wherein the first parameter of the combined linear model is determined based on formula: $A=(m \times \alpha 2 + p)/n + \alpha 1$ and the second parameter of the combined linear model is determined based on formula: $B=(m \times \beta 2 + p)/m + \beta 1$, wherein A is the first parameter of the combined linear model, B is the second parameter of the combined linear model, $\alpha 1$, $\alpha 2$ are the first parameters of the first linear model and the second linear model, $\beta 1$, $\beta 2$ are the second parameters of the first linear model and the second linear model, m and 1/n are two scaling factors, and p is a rounding offset.

27. The non-transitory computer readable medium of claim 26, wherein decoding the index from the bitstream further comprises:
   decoding a first index in a first level and a second index in a second level; and
   determining the set of parameters from the plurality of sets of parameters is based on the first index and the second index.

28. The non-transitory computer readable medium of claim 26, wherein the method further comprises:
   determining a reconstructed sample value of the first chroma component equal to the predicted sample value of the first chroma component for a current block without decoding prediction residuals and a coded transform block pattern (CTP) flag of the first chroma component.

* * * * *